United States Patent [19]
Kinukawa et al.

[11] Patent Number: 5,579,772
[45] Date of Patent: Dec. 3, 1996

[54] SURGICAL MICROSCOPE SYSTEM

[75] Inventors: Masahiko Kinukawa, Sagamihara; Masami Hamada; Hiroshi Fujiwara, both of Tokyo; Takashi Fukaya, Sagamihara; Masanori Kaneda; Toyoharu Hanzawa, both of Tokyo; Susumu Takahashi, Iruma; Nobuaki Akui, Tokyo; Katsuyuki Saito, Tokyo; Yoshinao Oaki, Tokyo, all of Japan

[73] Assignee: Olympus Optical Co., Ltd., Tokyo, Japan

[21] Appl. No.: 259,020

[22] Filed: Jun. 13, 1994

[30] Foreign Application Priority Data

Jun. 14, 1993 [JP] Japan ................................ 5-142046
Jun. 14, 1993 [JP] Japan ................................ 5-142048
Jun. 15, 1993 [JP] Japan ................................ 5-143686
Jun. 15, 1993 [JP] Japan ................................ 5-143687

[51] Int. Cl.$^6$ .................................................. G02B 21/22
[52] U.S. Cl. ........................... 128/665; 359/377; 359/462
[58] Field of Search .................... 128/653.1, 665; 348/51–53, 61, 79, 143; 359/376–378, 462, 466; 345/7, 8

[56] References Cited

U.S. PATENT DOCUMENTS 4,395,731  7/1983  Schoolman .
4,987,488  1/1991  Berci .
5,261,404  11/1993  Mick et al. .

*Primary Examiner*—Ruth S. Smith
*Attorney, Agent, or Firm*—Frishauf, Holtz, Goodman, Langer & Chick

[57] ABSTRACT

A surgical microscope system having a stereoscopic optical system, an imaging unit, and a monitor display. The stereoscopic optical system has two optical paths and forms a 3D image of an object. The imaging unit forms two images of the object from two light beams focused in the optical paths. The monitor display displays the images of the object which the imaging unit has formed. The surgical microscope system further comprises an observation-light receiving section located in the optical paths for determining an observation field, an observation-light emitting section located in the monitor display for applying the images formed by the imaging unit, and reflectors arranged between the observation-light receiving section and the observation-light emitting section. The observation-light receiving and the observation-light emitting sections are located close to each other and a barrel holds the sections together. Images displayed on the monitor display are projected such that the observer perceives a 3-dimensional virtual image located at a distance from the observer equal to the actual distance between the observer and the object.

1 Claim, 27 Drawing Sheets

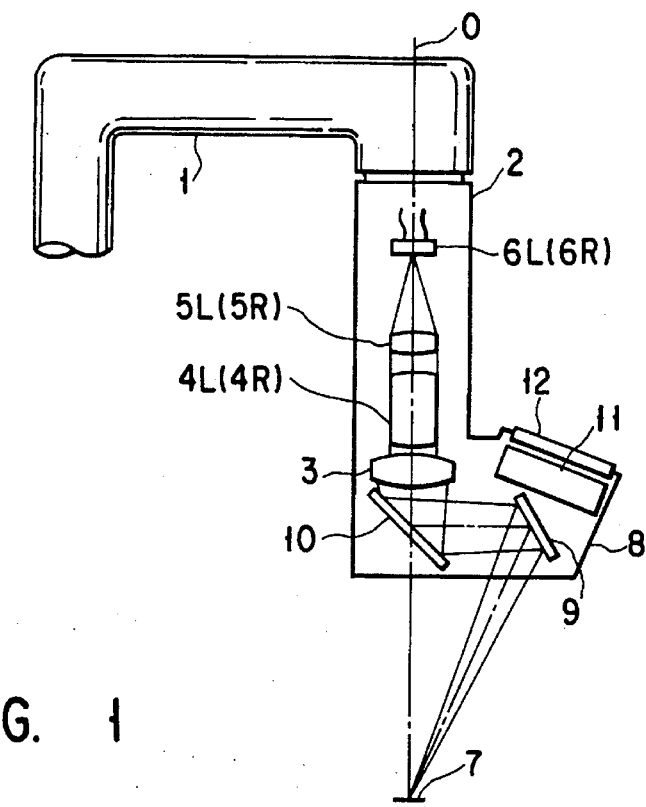
F I G. 1
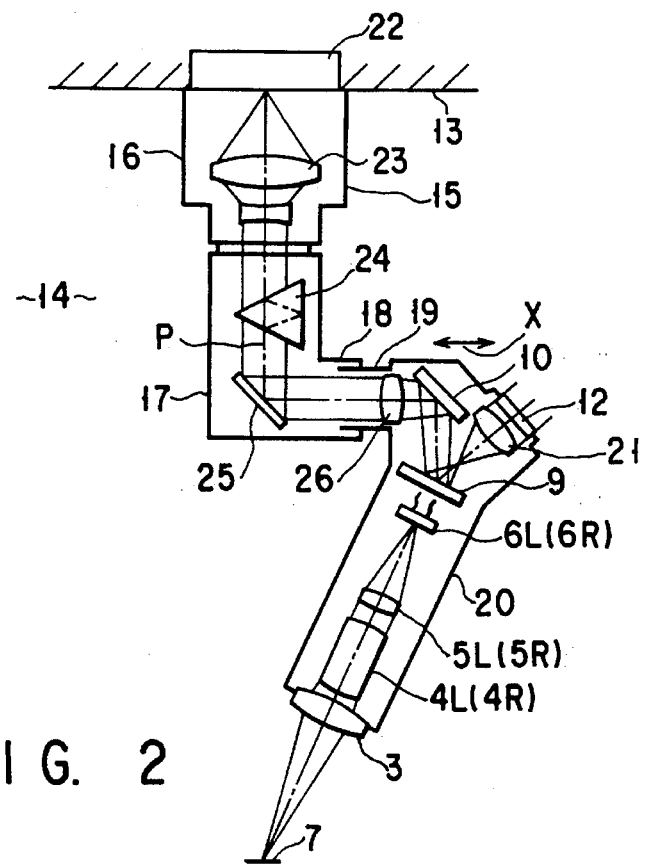
F I G. 2

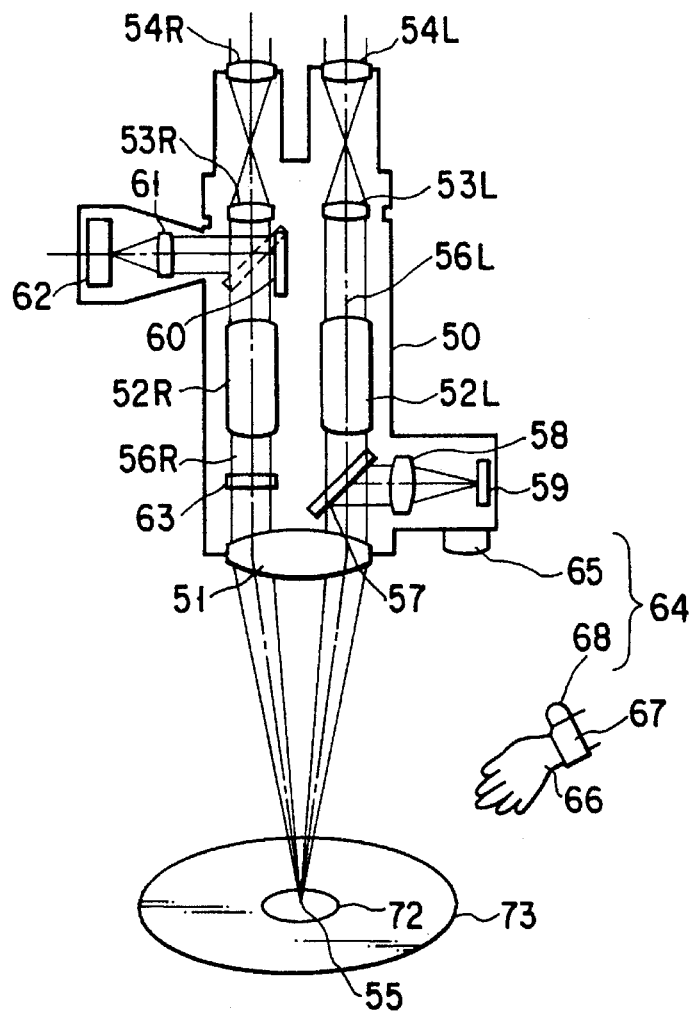
F I G. 5
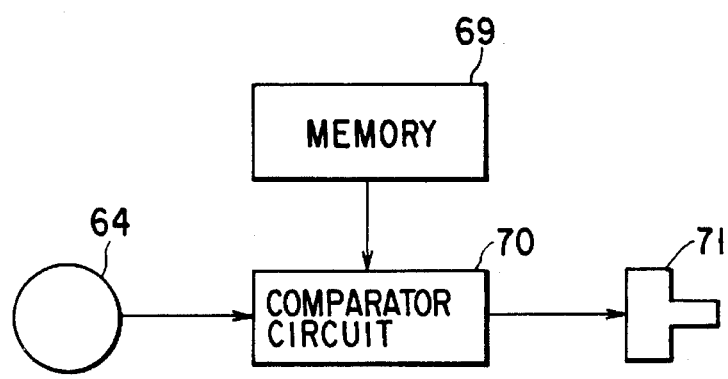
F I G. 6

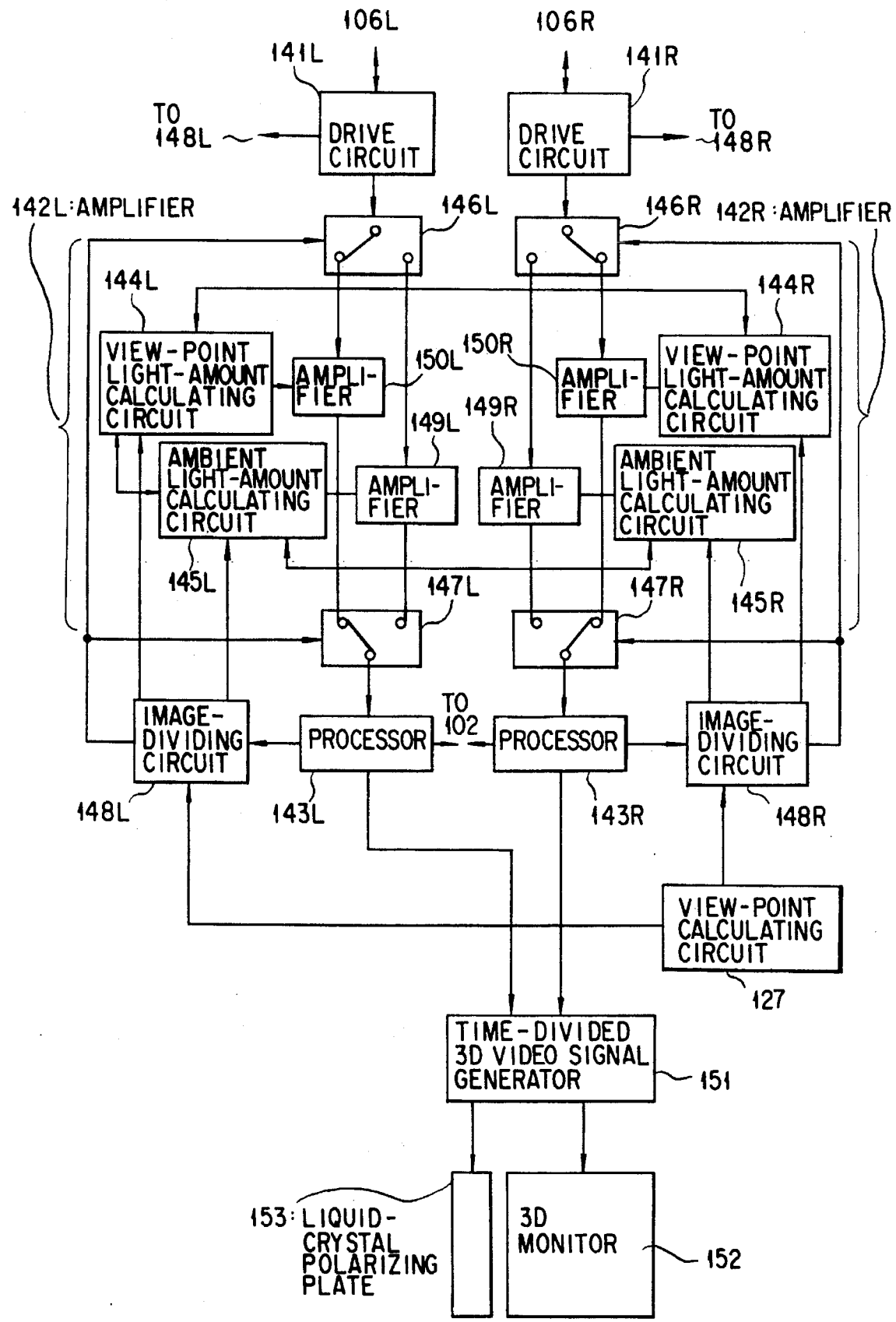
F I G. 16

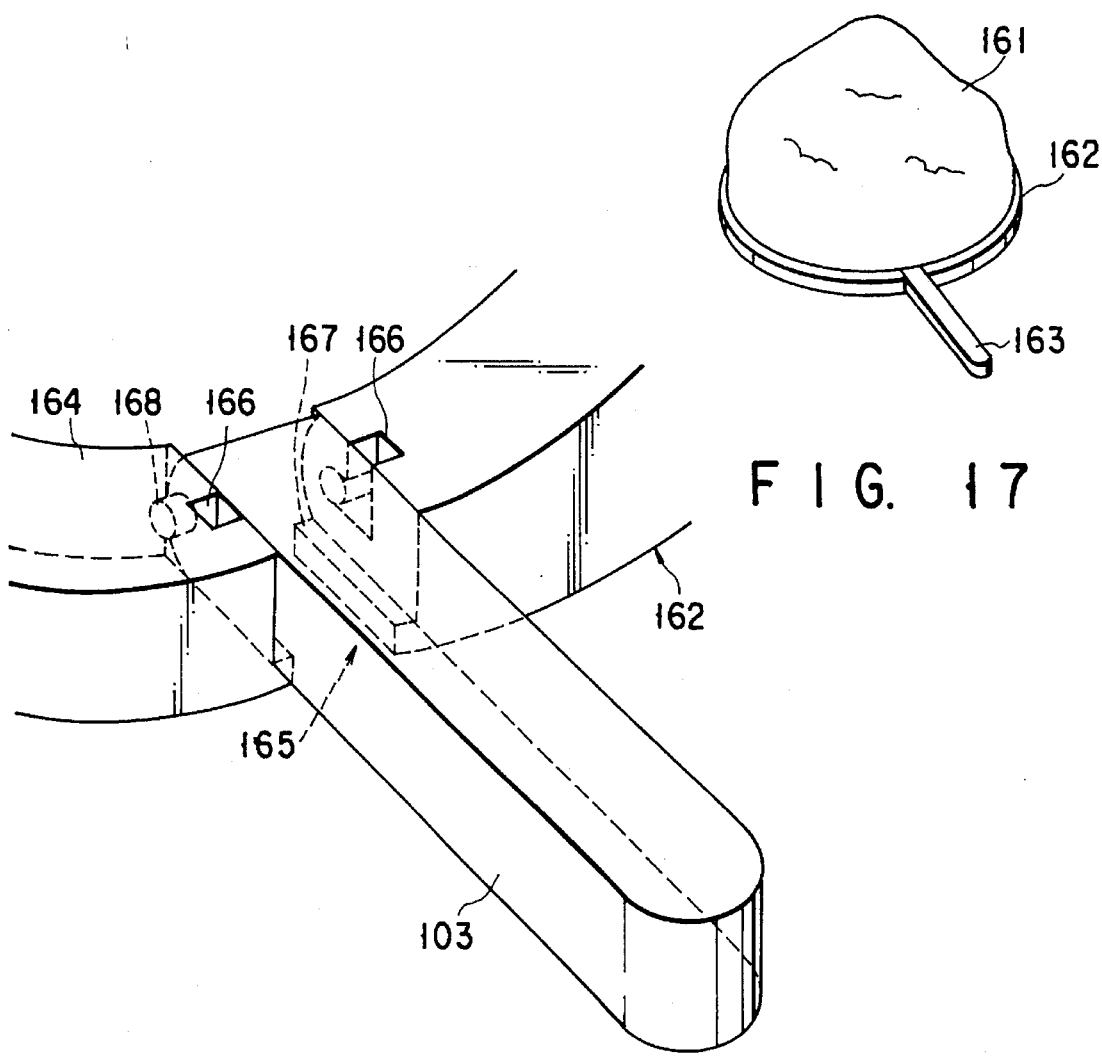
FIG. 17
FIG. 18
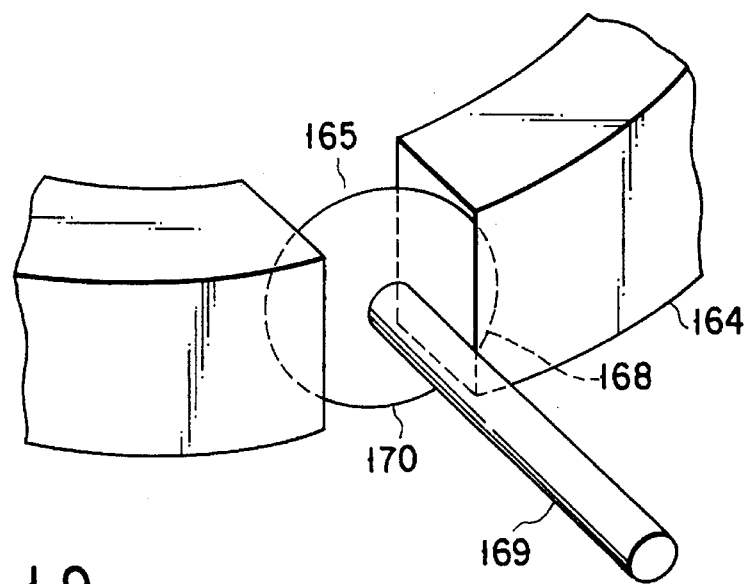
FIG. 19

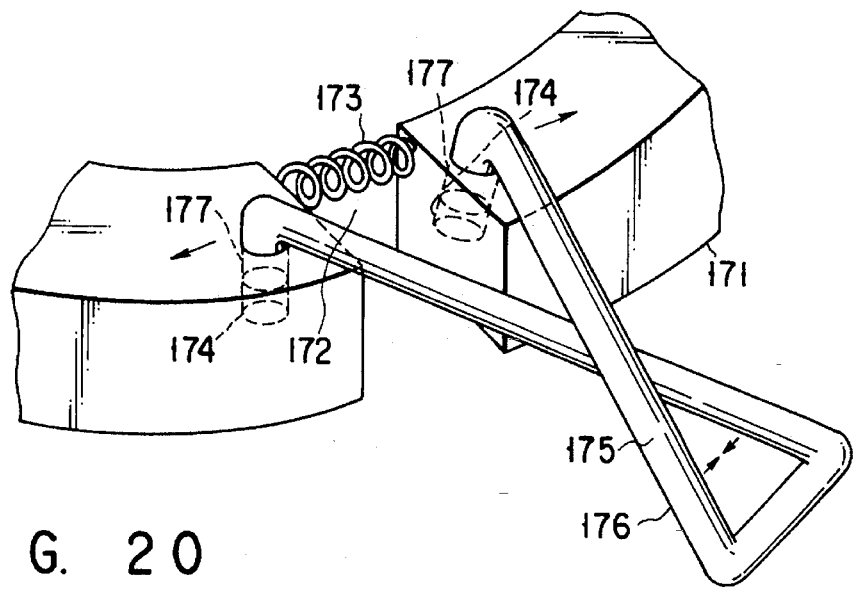
FIG. 20
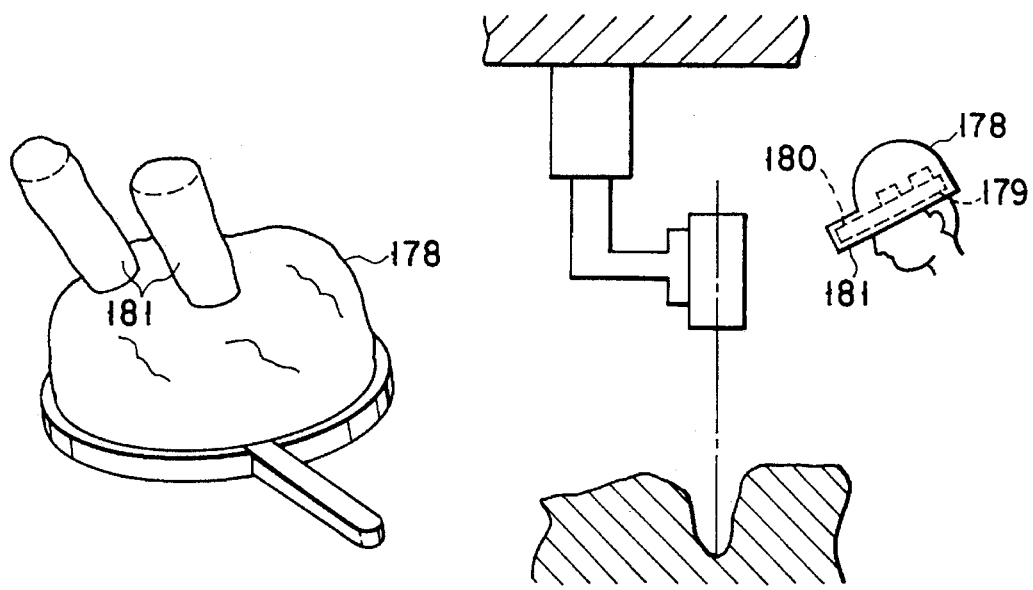
FIG. 21
FIG. 22
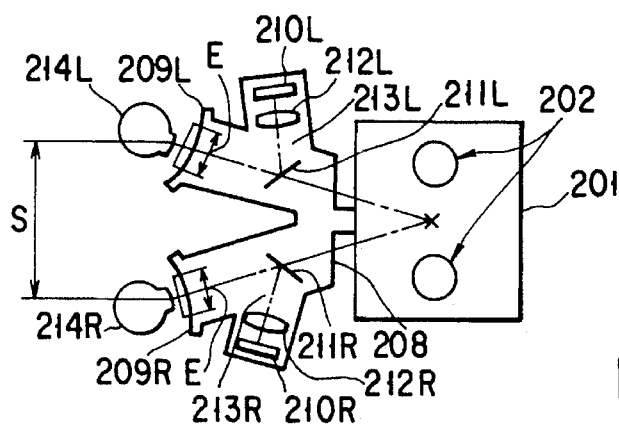
FIG. 23

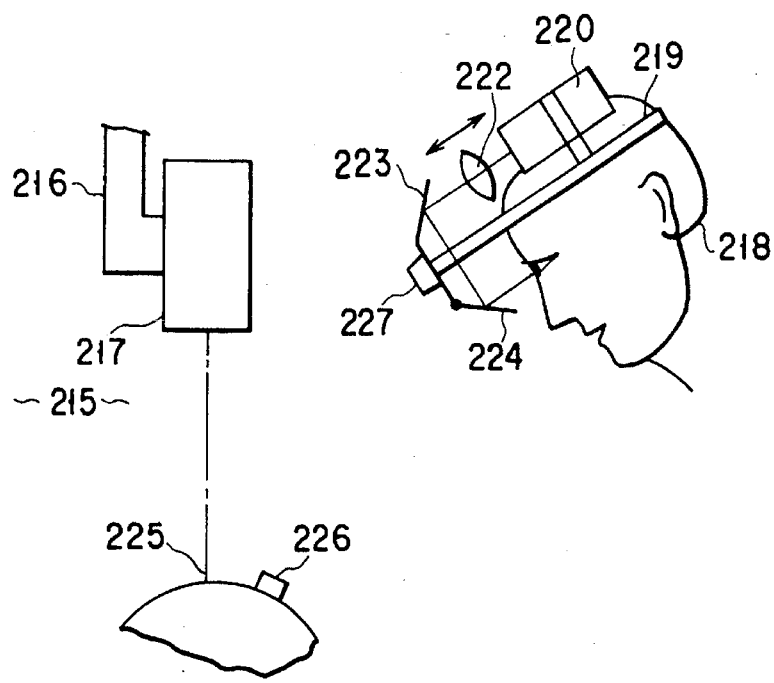
F I G. 25
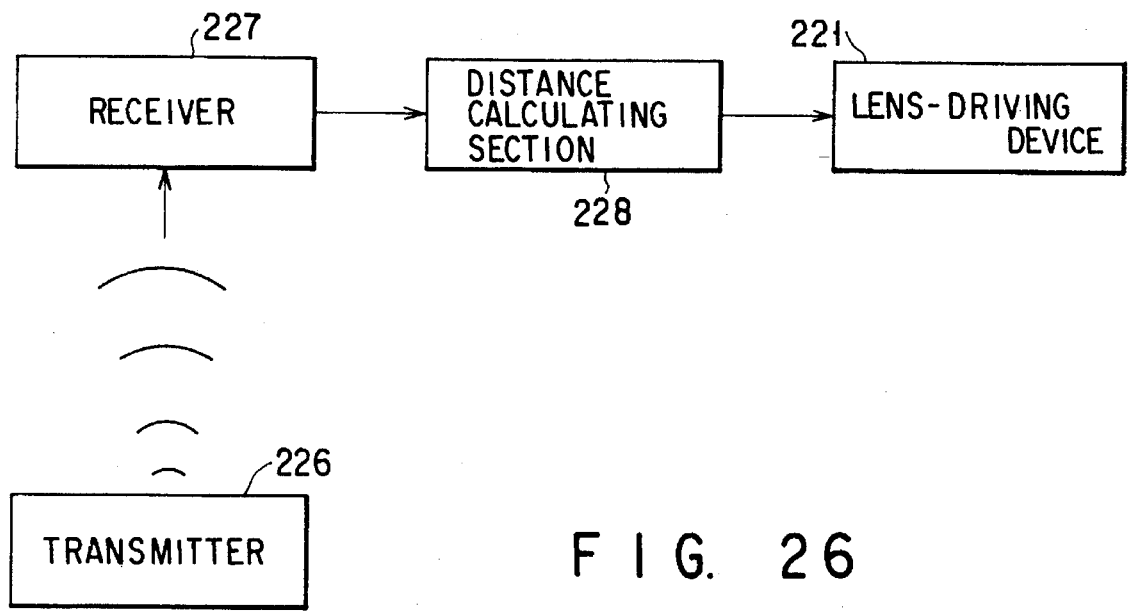
F I G. 26

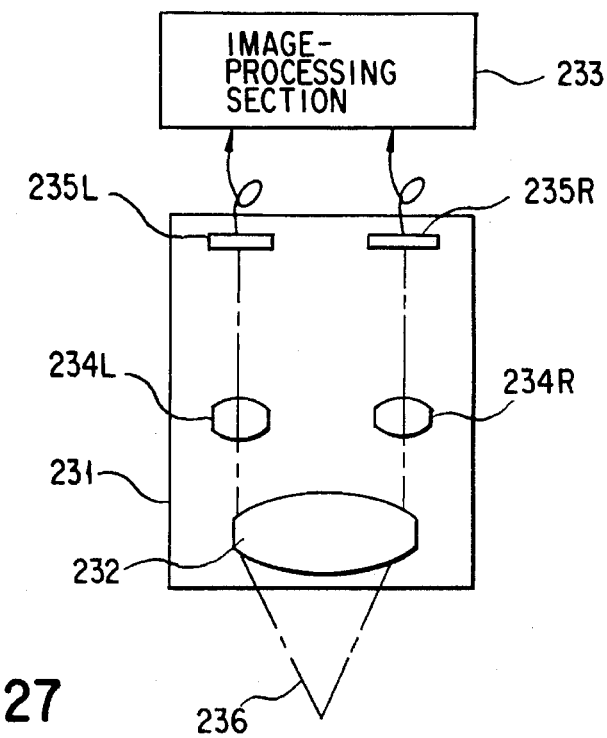
F I G. 27
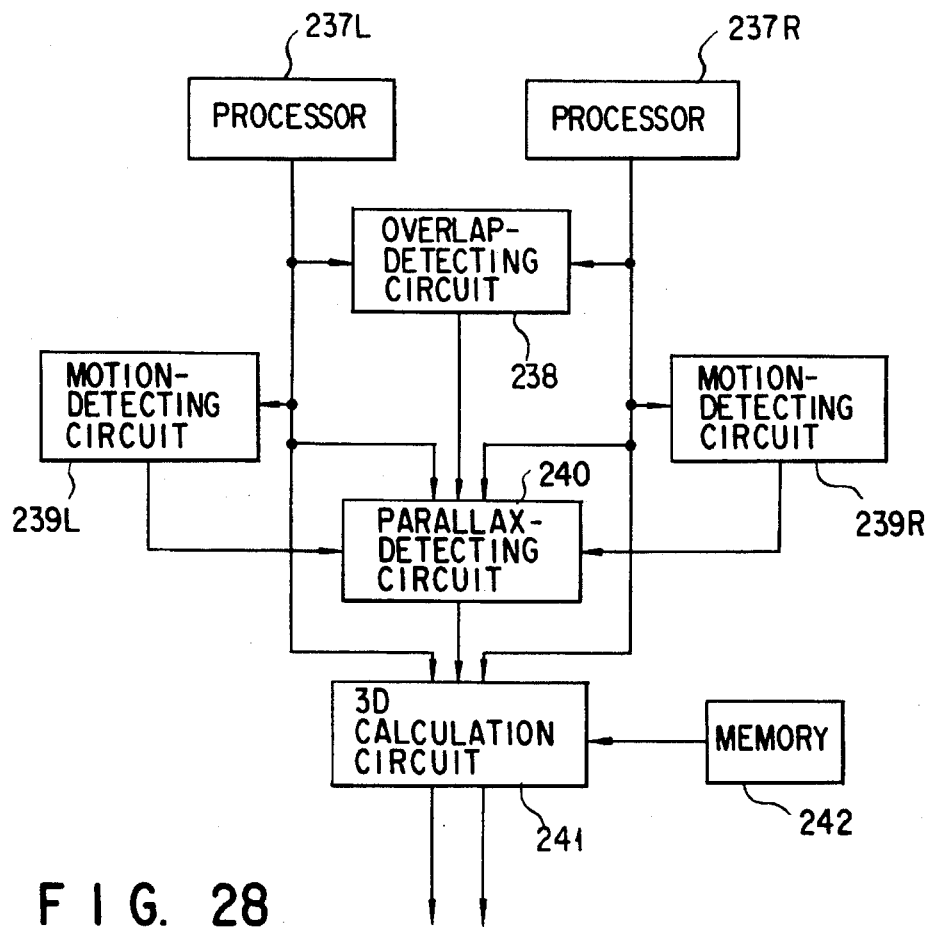
F I G. 28

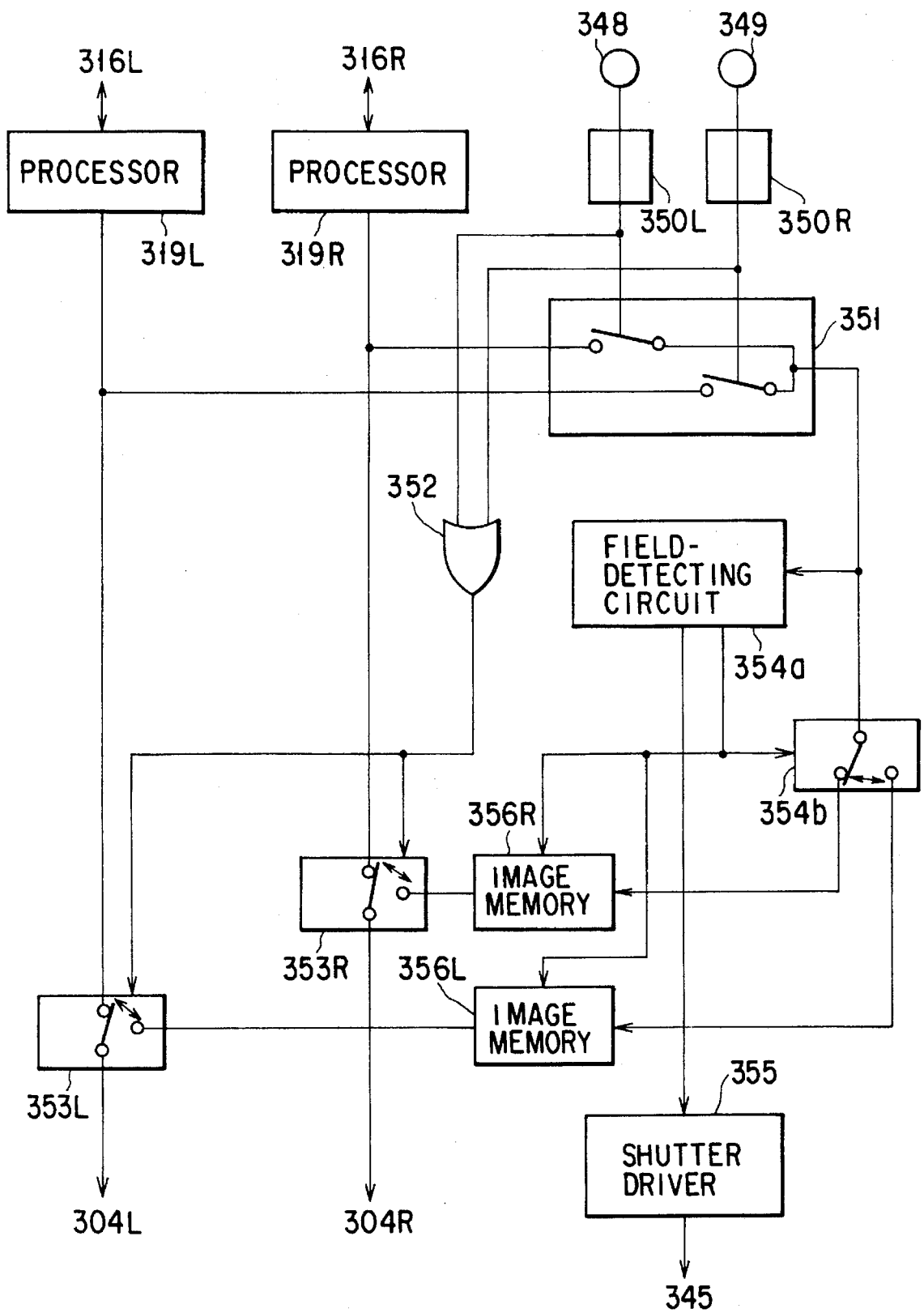
F I G. 38

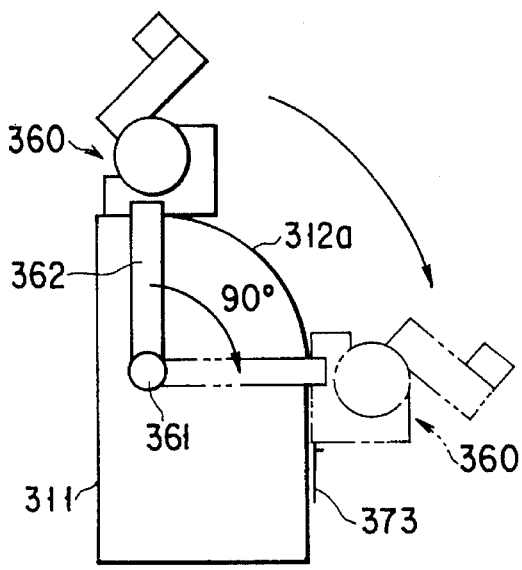
F I G. 42
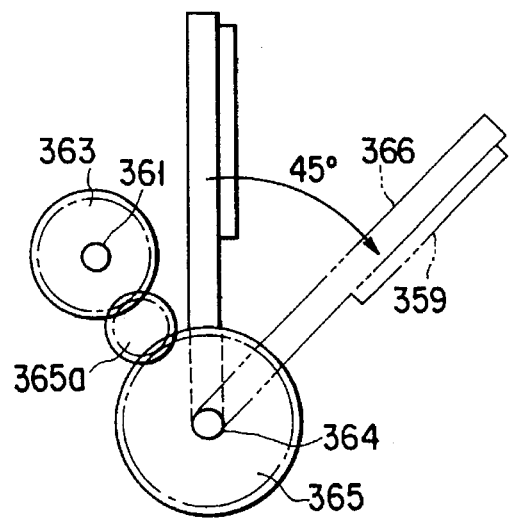
F I G. 43
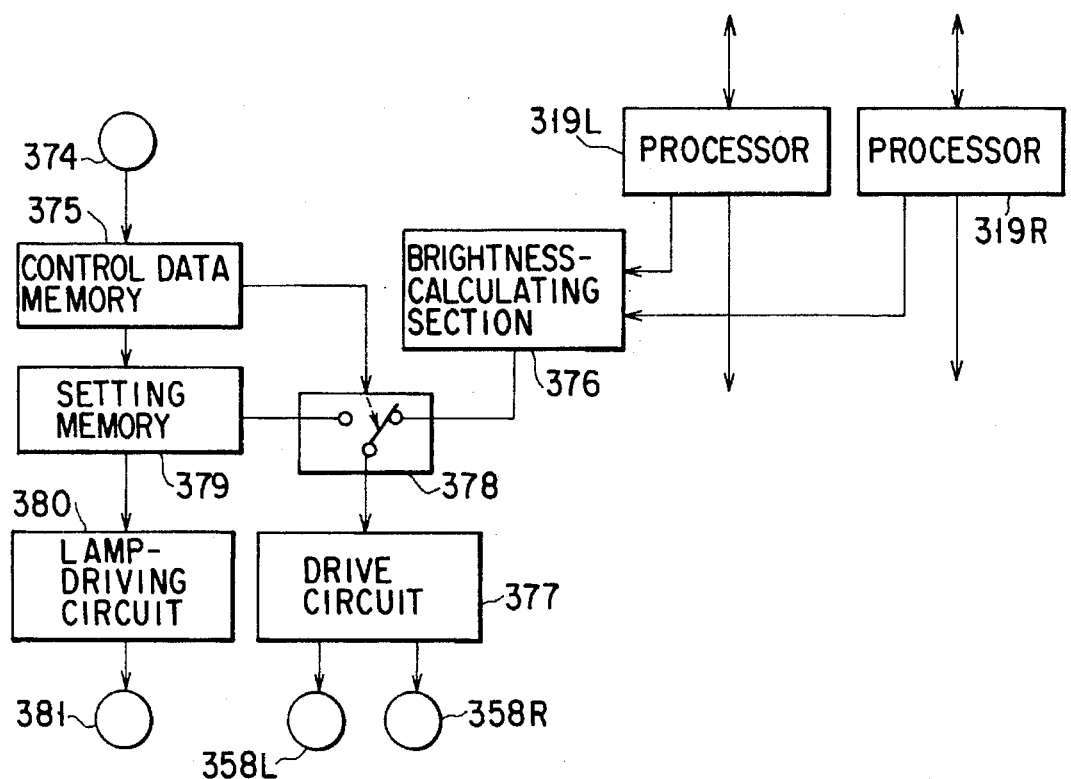
F I G. 44

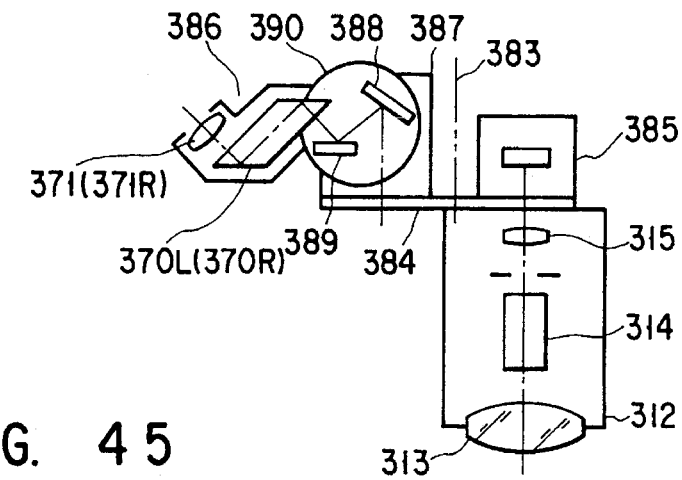
F I G. 45
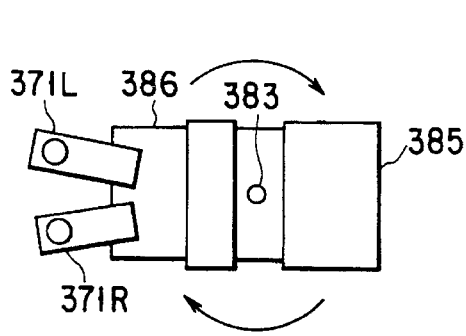
F I G. 46
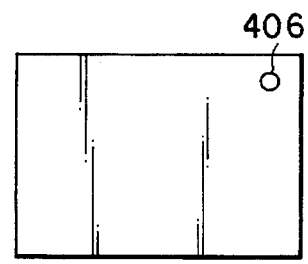
F I G. 48
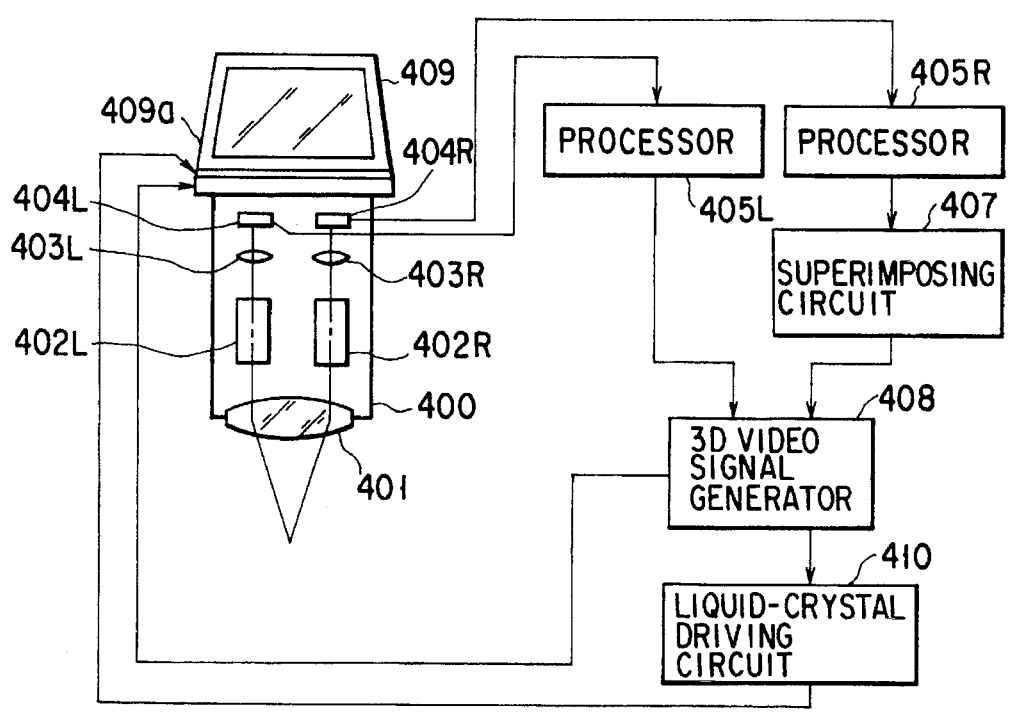
F I G. 47

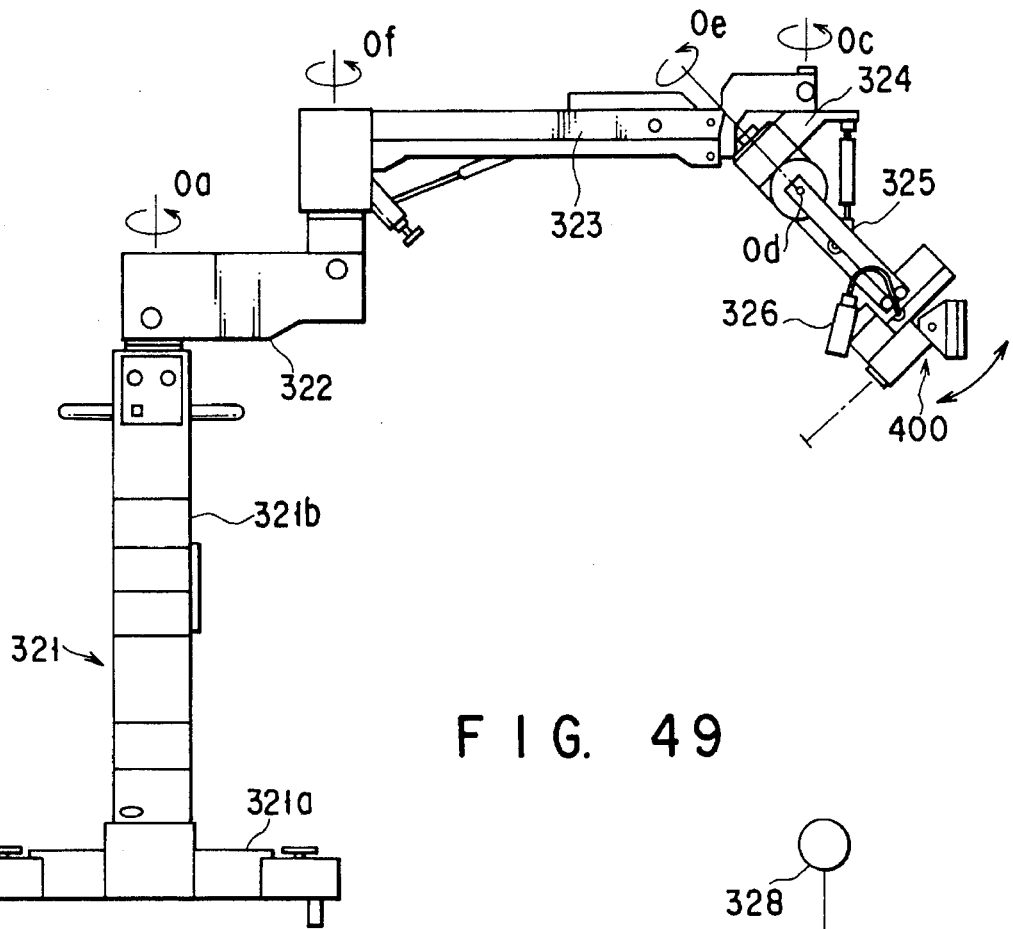
F I G. 49
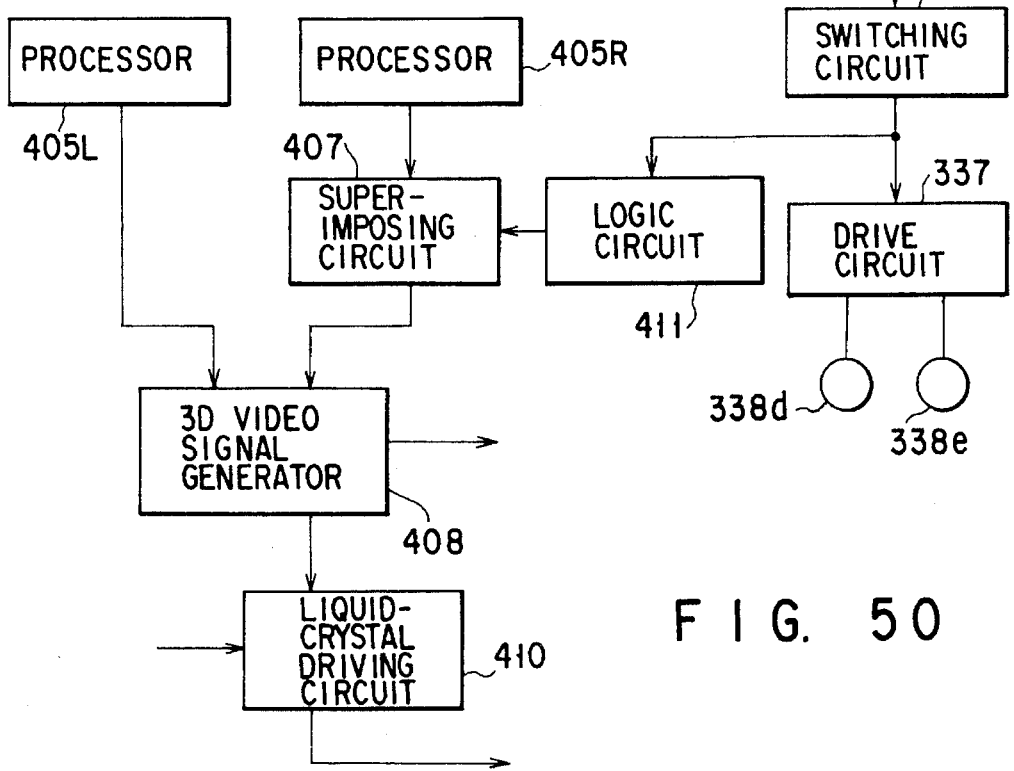
F I G. 50

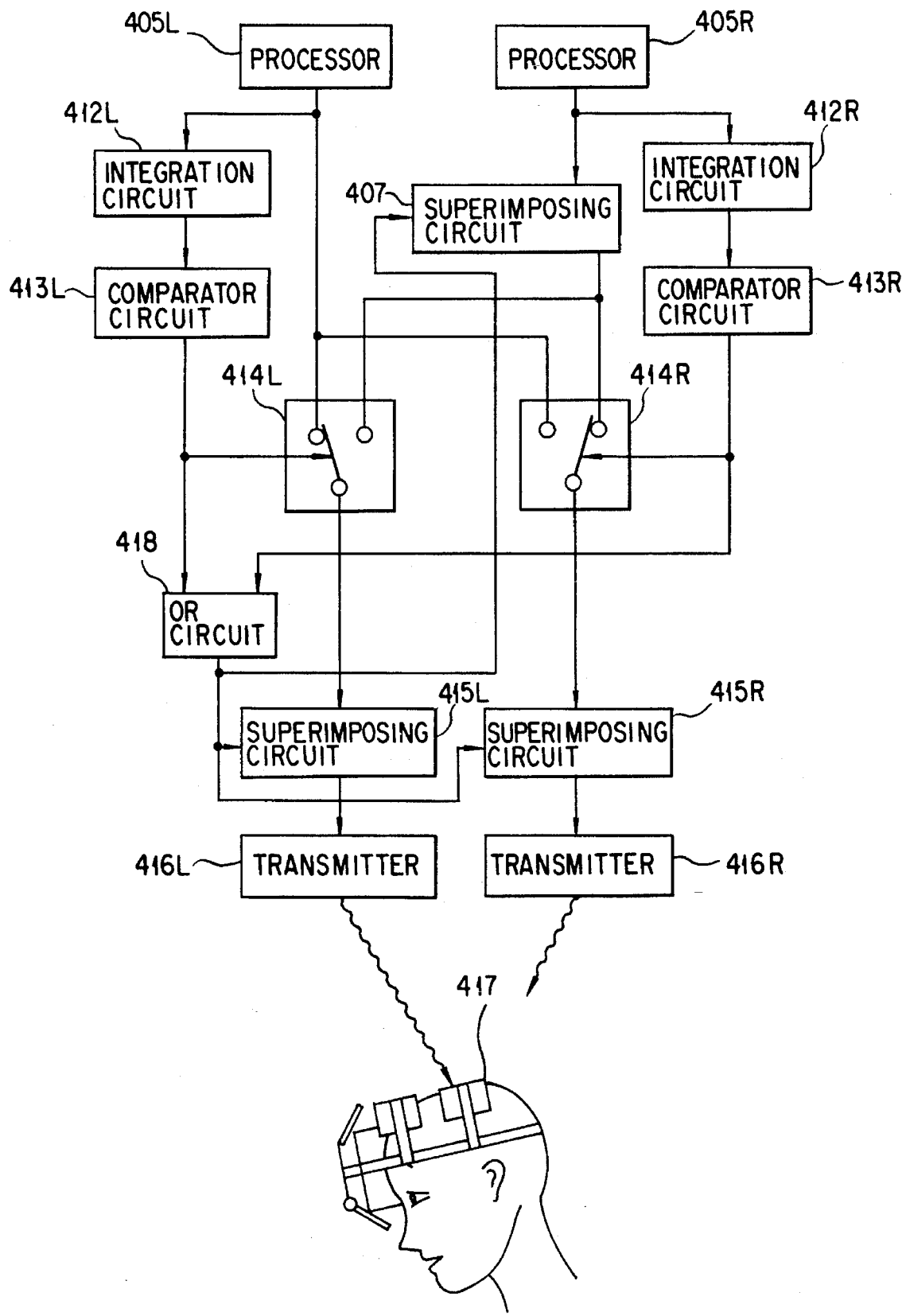
F I G. 51

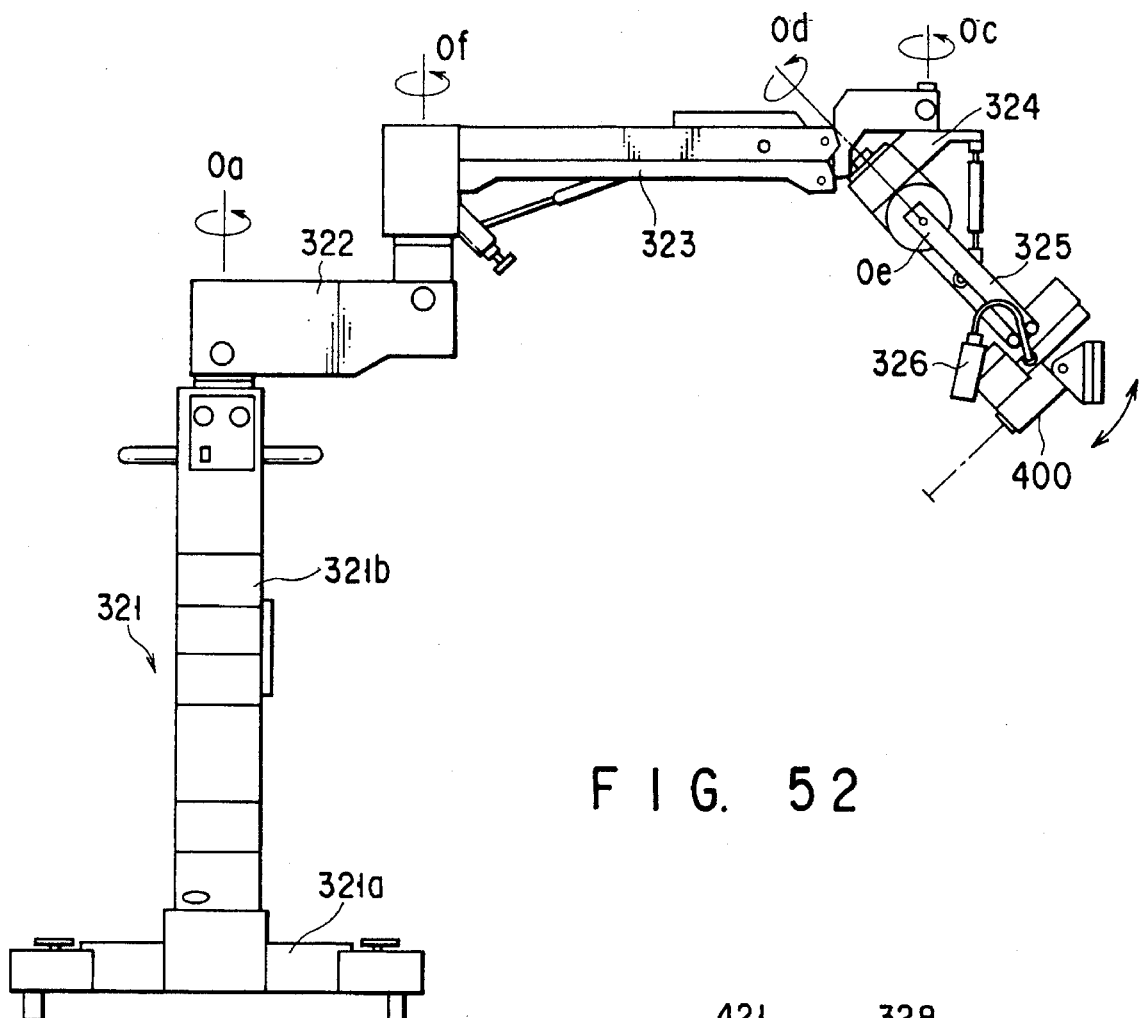
F I G. 52
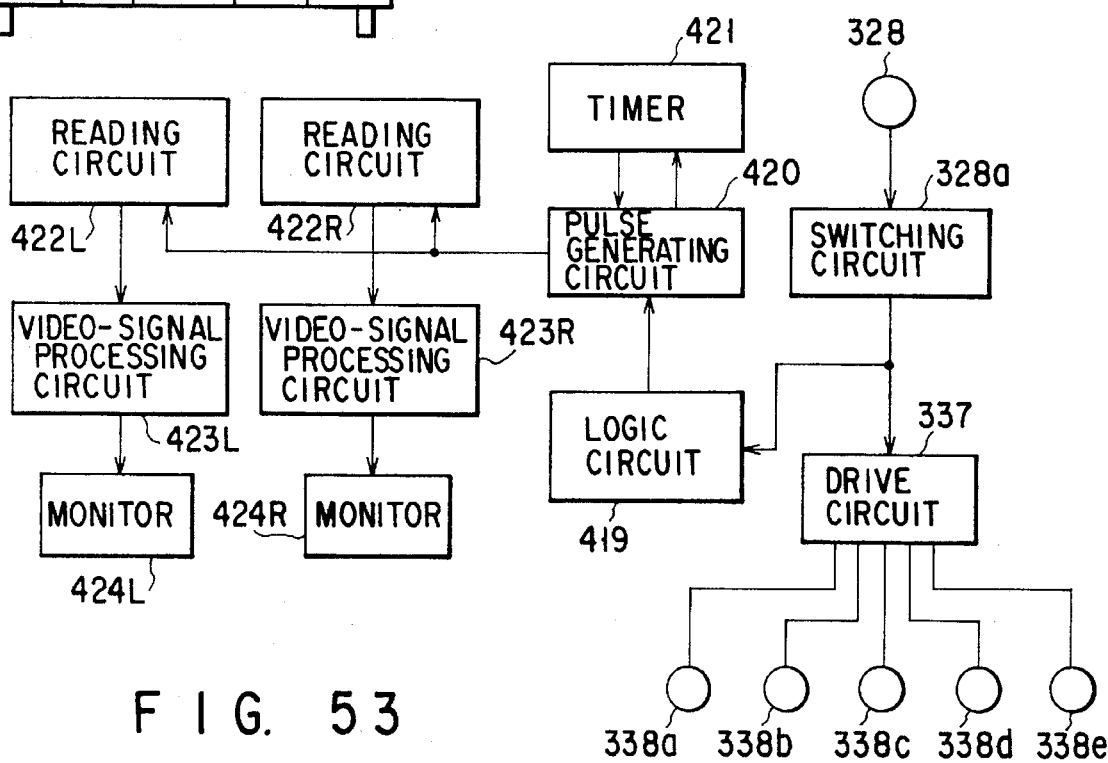
F I G. 53

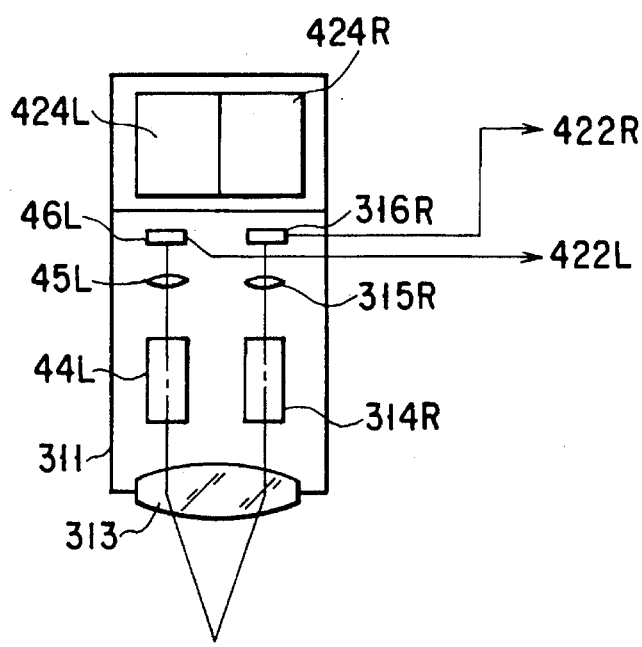
F I G. 54
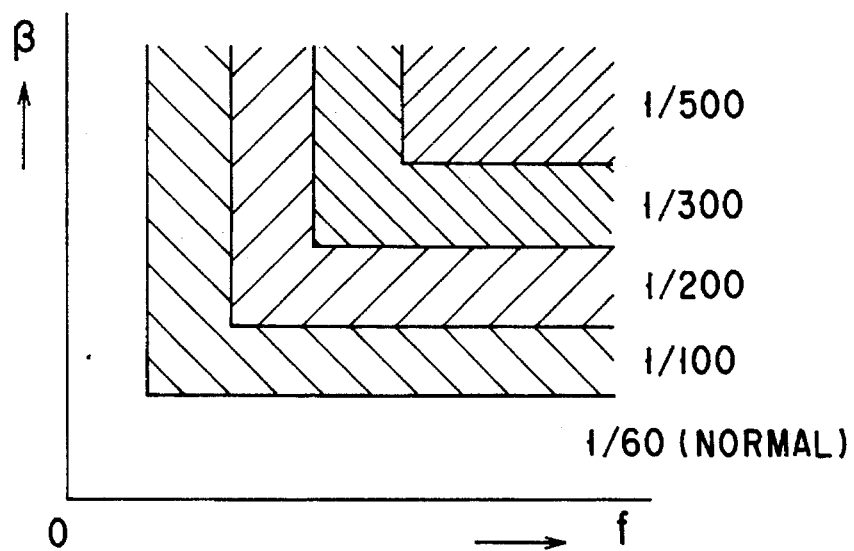
F I G. 56

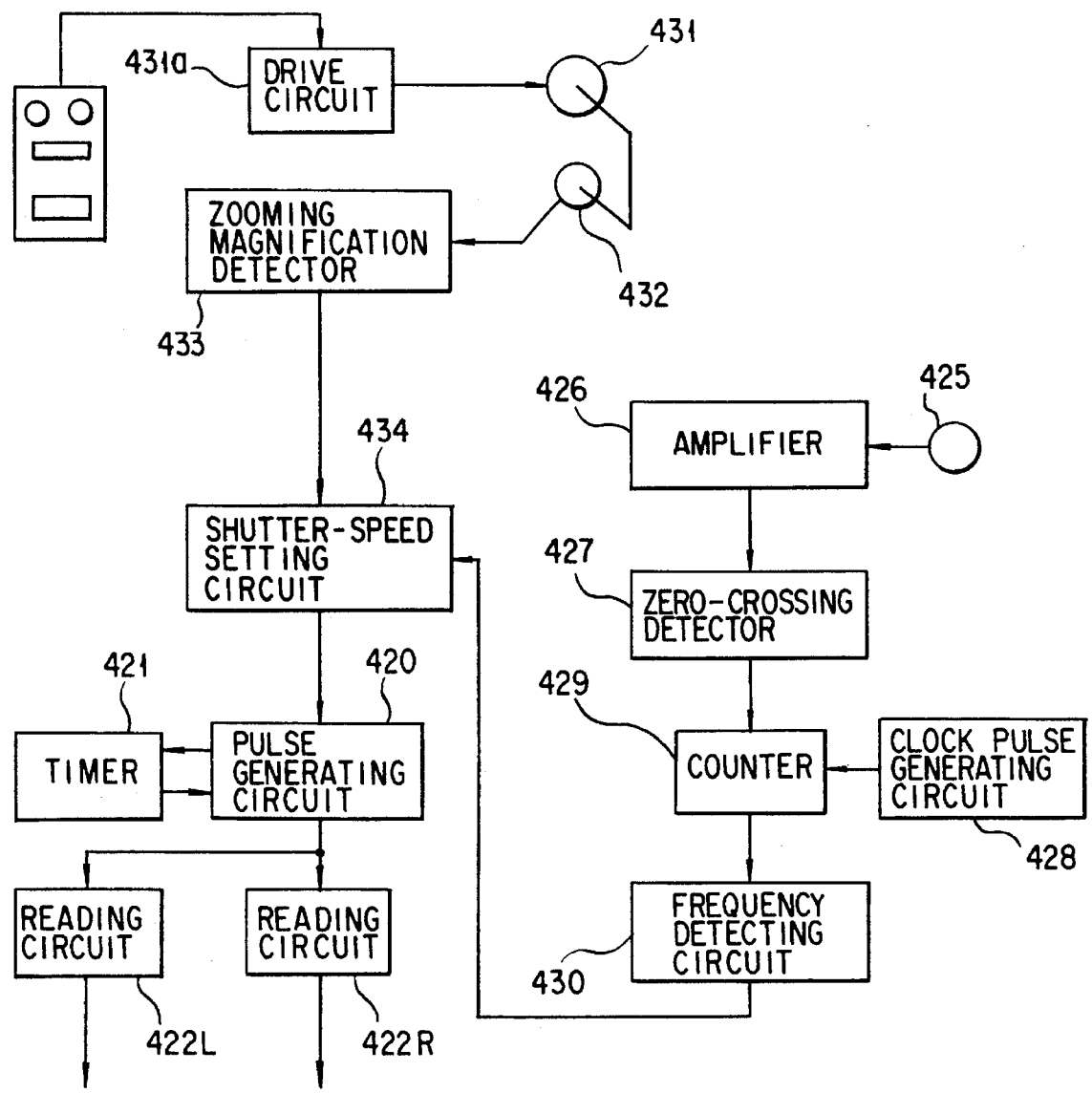
F I G. 55

SURGICAL MICROSCOPE SYSTEM

BACKGROUND OF THE INVENTION

1. Field of the Invention

The present invention relates to a surgical microscope system, and more particularly to a surgical microscope system having an imaging section for forming an image of an object being observed, and a display section for displaying the image formed by the imaging section.

2. Description of the Related Art

In recent years, so-called microsurgery has been performed in increasing numbers, thanks to the new surgical techniques invented and the novel surgical instruments developed. In an ophthalmological or neurosurical operation, for example, a surgeon uses a surgical microscope system having an observation optical system, to observe a magnified image of the object he or she is treating.

Most surgical microscope systems comprise a barrel which contains a microscope, and a support which supports and holds the barrel at a desired position at a desired angle.

A surgical microscope system which comprises an observation optical section and an imaging section is disclosed in, for example, Jpn. Pat. Appln. KOKAI Publication No. 3-39711. The imaging section has a light-receiving surface which is located at a focal point of the objective optical unit incorporated in the observation optical section. The imaging section generates a video signal representing an image of an object. The video signal is supplied to a display section, which displays the image of the object.

East German Patent No. 259265 discloses another type of a surgical microscope system which comprises a head-mount display or a TV monitor display for displaying an image of an object formed by an imaging section so that a surgeon may observe a left image and a right image both reflected by a mirror.

The conventional surgical microscope systems are disadvantageous in the following respects.

First, since the imaging section and the display section are contained in the barrel and located near the ocular section, the barrel is large and therefore acts as an obstacle to the surgeon who is performing an operation. If the barrel contains a monitor as well, the barrel will be considerably long, reducing the working space available to the surgeon. To provide a sufficient working space, the imaging section and the display section may be located in a separate manner—the former near the object the surgeon is treating, and the latter near the surgeon's eyes.

However, when the surgeon, who customarily moves the ocular section to another object, turns his or her head to see the other object through the ocular section, he or she cannot see an image of the other object since the imaging section does not move to the other object.

Second, an image formed by the imaging section and displayed by the display section looks whitish and is hard to see, particularly when it is too bright, due to the limited dynamic range of the display section. The adjustment ability which the human eyes possess cannot be utilized as in observing a 3D image through an ordinary stereoscopic microscope. It is necessary to adjust the view-point brightness and control the focusing, with more accuracy. To enable the surgeon to observe a 3D image, the left and right images must have the same brightness. However, the images cannot always be identical in brightness since the left and right optical paths are not arranged in a same direction. The left and right images must be adjusted in terms of brightness with high accuracy in order to provide a 3D image.

Third, a surgeon who is observing an object with a microscope and places his or her eyes on the two ocular lenses of the microscope may fail to locate the object since the object is present outside the lines of vision. If the surgeon wears a head-mount display, the object may be placed on the lines of vision, but the surgeon cannot correctly grasp the distance between him or her and the object.

Fourth, in the case of a so-called video microscope system which enables a surgeon to perform an operation on an object while seeing a magnified image of the object, the image will disappear if any electric component malfunctions or if any signal cable is cut. In such a case, the surgeon cannot continue the operation.

SUMMARY OF THE INVENTION

Accordingly, the object of the present invention is generally to provide a surgical microscope system which enables a surgeon to perform an operation with high efficiency.

A specific object of the invention is to provide a surgical microscope system having a barrel which is small enough to give a sufficient working space and which can still secure a large view field.

Another specific object of the invention is to provide a surgical microscope system which can adjust the left and right images to the same brightness to form a 3D image.

Still another specific object of the present invention is to provide a surgical microscope system with which a surgeon can perform an operation while keeping his or her eyes on an object and correctly perceiving the distance between the eyes and the object.

A further specific object of this invention is to provide a surgical microscope system with which a surgeon can continue an operation even if the imaging section malfunctions and ceases to provide an image of an object he or she is treating.

According to a first aspect of the invention, there is provided a surgical microscope system which has: a stereoscopic optical system for forming a 3D image of an object; imaging means for forming two images of the object from two light beams focused in the two optical paths of the microscope; and display means for displaying the images of the object which the imaging means has formed. The surgical microscope system further comprises observation-light receiving means located in the optical paths, for determining an observation field; observation-light emitting means located in the display means, for emitting applying the images formed by the imaging means; an optical-path deflecting member arranged between the observation-light receiving means and the observation-light emitting means, such that these means are located close to each other; and holder means holding the observation-light receiving means and the observation-light emitting means together.

With such a surgical microscope system, a surgeon can perform an operation on an object, while observing the 3D image of the object which is displayed by the display means. Since his or her line of vision aligns with the axis of the observation-light receiving means, the surgeon can efficiently operate the system during the operation. Furthermore, the observation-light receiving means and the observation-light emitting means are incorporated together in the barrel, giving the surgeon a sufficient work space.

The system can be operated with high efficiency since the surgeon's line of vision is directed to the object he or she is treating. The barrel of the system is small enough to provide a sufficient working space and can secure a large view field.

According to a second aspect of the invention, there is provided a surgical microscope system which has: a stereoscopic optical system for forming a 3D image of an object; imaging means for generating two video signals representing left and right images of the object, from two light beams focused in the left and right optical paths of the microscope; display means for displaying the images of the object which the imaging means has formed; view-point detecting means for detecting a view point of a surgeon who is using the system; and view-point calculating means for determining a position of the view point. The surgical microscope system further comprises image-extracting means for extracting parts of video signals generated by said imaging means; a light-mount calculating circuit for calculating an amount of light from the parts of the video signals which have been extracted by the image-extracting means; and light-amount adjusting means for adjusting the amount of light in the left and right optical paths, in accordance with the amount of light calculated by the light-mount calculating circuit.

The view-point detecting means detects the view point of the surgeon from two data items representing a Purkinje-effect image and the center of the iris. Signals representing the view point are input to the view-point detecting means. The view-point calculating means determines the position which the view point assumes a field. If the view point detected has stayed in that position for a predetermined period, the image-extracting means extracts those parts of the video signals which correspond to the view point. From the extracted parts of the video signals, the light-amount calculating circuit calculates the best possible amount of light to be applied through the left and right optical paths. In accordance with the amount of light thus calculated, the light-amount adjusting means adjusts the amount of light in the left and right optical paths. As a result, the left and right images obtained by the imaging means have no difference in brightness and can form a 3D image.

According to a third aspect of this invention, there is provided a surgical microscope system which has: a stereoscopic optical system for forming a 3D image of an object; imaging means for forming two images of the object from two light beams focused in the two optical paths of the microscope; and display means for displaying the images of the object which the imaging means has formed. The surgical microscope system further comprises image-projecting means for projecting the image displayed by the display means to a position coincident with that of the object.

This system enables a surgeon to feel that the monitor image is located at a distance identical to that between his or her eyes and an object he or she is treating. Hence, the surgeon can perform an operation on the object with high efficiency, while observing the 3D image displayed by the imaging means.

According to a fourth aspect of this invention, there is provided a surgical microscope system which has: a stereoscopic optical system for forming a 3D image of an object; imaging means for forming two images of the object from two light beams focused in the two optical paths of the microscope; and display means for displaying the images of the object which the imaging means has formed. The surgical microscope system further comprises an ocular section for enabling a surgeon to observe a 3D image formed by the stereoscopic optical system; and switching means for selecting the imaging means or the ocular barrel.

Even if the 3D image disappears while the surgeon is performing an operation on the object, due to, for example, the malfunction of an electric part or disconnection of a signal cable, the surgeon can see the image through the stereoscopic optical system, merely by operating the switching to select the optical system instead of the imaging means. The surgeon can therefore keep on performing the operation. In view of this, the surgical microscope system is safe and reliable.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a diagram showing a surgical microscope system which is a first embodiment of the present invention;

FIG. 2 is a diagram showing a surgical microscope system which is a second embodiment of the invention;

FIG. 5 is a schematic representation of a first modified surgical microscope system according to this invention;

FIG. 6 is a block diagram of the electric unit incorporated in the first modified microscope system;

FIG. 16 is a block diagram of the electric unit incorporated in a surgical microscope system which is a sixth embodiment of the present invention;

FIG. 17 is a perspective view of a drape;

FIG. 18 is a perspective view explaining how the handle of the drape is connected to the ring of the drape;

FIG. 19 is a perspective view showing the handle and ring of a modified drape;

FIG. 20 is a perspective view showing the handle and ring of another modified drape;

FIG. 21 is a perspective view of another type of a drape;

FIG. 22 is a diagram explaining how the drape shown in FIG. 21 is used;

FIG. 23 is a plan view schematically illustrating a surgical microscope system according to a seventh embodiment of the invention;

FIG. 25 is a diagram showing a surgical microscope system according to an eighth embodiment of the invention, which includes a head-mount display;

FIG. 26 is a block diagram of the electric unit incorporated in the system shown in FIG. 25;

FIG. 27 is a schematic representation of a fourth modified surgical microscope system according to this invention;

FIG. 28 is a block diagram of the electric unit incorporated in the fourth modified microscope system;

FIG. 38 is a block diagram of the electric unit incorporated in the eleventh embodiment;

FIG. 42 is a side view of the barrel;

FIG. 43 is a side view of the rotatable mirror incorporated in the twelfth embodiment;

FIG. 44 is a block diagram of the electric unit used in the twelfth embodiment;

FIG. 45 is a sectional front view of the barrel of a surgical microscope system according to a thirteenth embodiment of the present invention;

FIG. 46 is a plan view of the barrel illustrated in FIG. 45;

FIG. 47 is a schematic representation of a fifth modified surgical microscope system according to this invention;

FIG. 48 is a diagram showing an image displayed by means of the fifth modified system;

FIG. 49 is a side view of a sixth modified surgical microscope system according to the invention;

FIG. 50 is a block diagram of the electric unit incorporated in the sixth modified system;

FIG. 51 is a block diagram of the electric unit incorporated in a seventh modified surgical microscope system according to the present invention;

FIG. 52 is a side view of an eighth modified surgical microscope system according to the invention;

FIG. 53 is a block diagram of the electric unit used in the eighth modified system;

FIG. 54 schematically shows the barrel incorporated in the eighth modified system;

FIG. 55 a block diagram of the electric unit in corporated in a ninth modified surgical microscope system according to the invention; and FIG. 56 is a graph explaining how the shutter speed is changed in the ninth modified system.

DETAILED DESCRIPTION OF THE PREFERRED EMBODIMENTS

Figure 3:
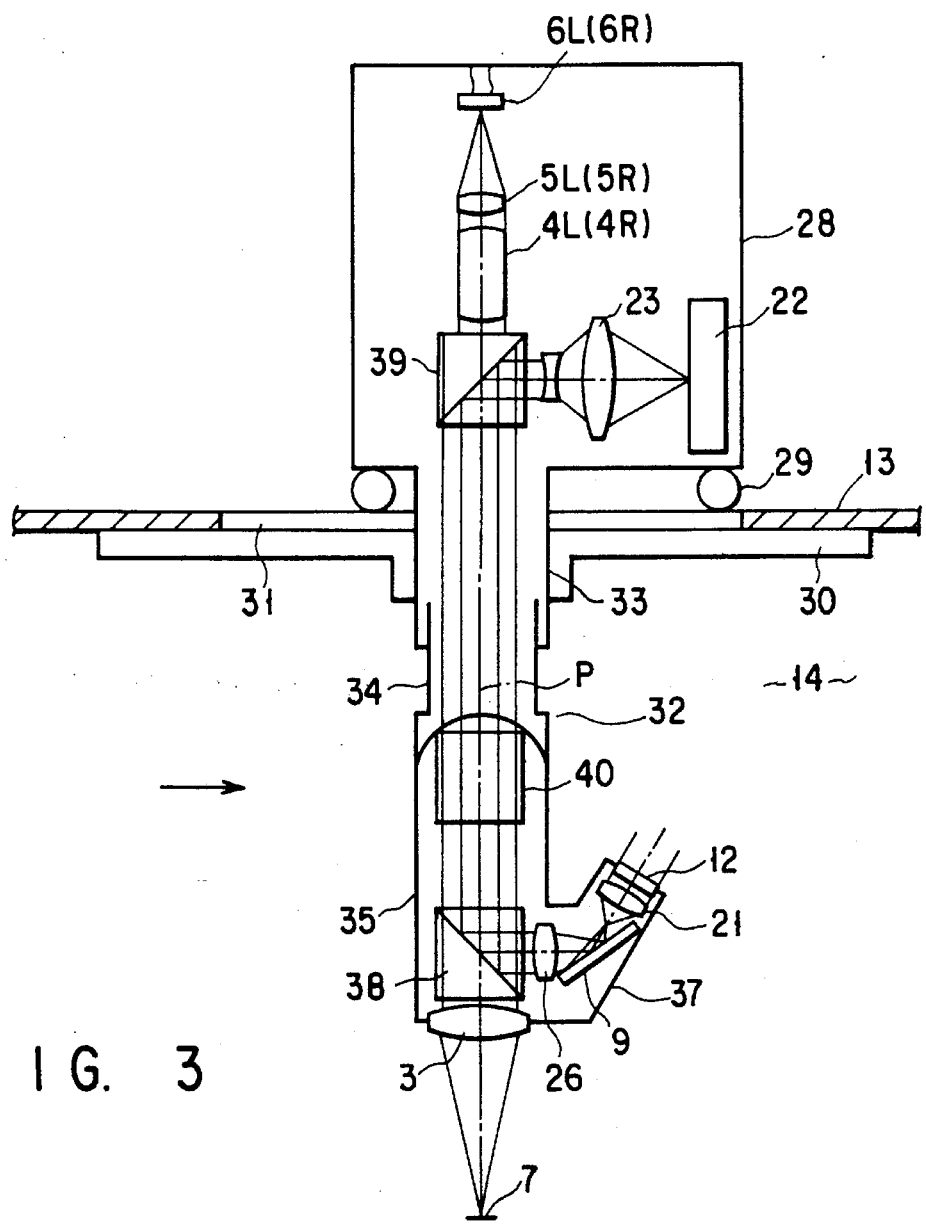
FIG. 3 is a diagram showing a surgical microscope system which is a second embodiment of this invention.

Embodiments of the present invention will now be described, with reference to the accompanying drawings.

FIG. 1 shows a first embodiment of the invention, which is a surgical microscope system. The surgical microscope system comprises a floor-mounted base (not shown), an arm 1, and a barrel 2. The arm 1 is attached at one end to the floor-mounted base. The barrel 2 is coupled to the other end of the arm 1 and can be rotated around its axis O.

The barrel 2 contains an objective lens 3, a pair of magnification-varying optical units 4L and 4R, a pair of focusing lenses 5L and 5R, and a pair of imaging devices 6L and 6R. These components are arranged in the order mentioned, from an object 7 to be examined through the surgical microscope system.

A projection 8 protrudes horizontally from the distal end portion of the barrel 2, made integral with the barrel 2 and extending at right angles to the axis O of the barrel 2. The projection 8 contains a first reflector 9 which is inclined about 45° to the horizontal plane. A second reflector 10 is contained in the barrel 2, is located below the objective lens 3, is inclined about 45° to the horizontal plane, and opposes the first reflector 9.

In operation, the first reflector 9 receives the light reflected from the object 7 and applies it to the second reflector 10, which applies the light to the objective lens 3. The light passing through the objective lens 3 is applied to the imaging device 6L through the magnification-varying optical unit 4L and the focusing lens 5L, and is applied also to the imaging device 6R through the magnification-varying optical unit 4R and the focusing lenses 5R.

The imaging devices 6L and 6R each comprise a color-resolution prism, a R-imaging element, a G-imaging element, a B-imaging element and an image-forming circuit—all not shown in FIG. 1. The image-forming circuit receives the R-signal, the G-signal and the B-signal output by the R-imaging element, the G-imaging element and the B-imaging element and converts these signals to a color video signal. The color video signals generated by the devices 6L and 6R are supplied to a monitor 11 (i.e., a display) contained in the projection 8 and located on the optical path along which the light reflected from the object 7 travels to the first reflection 9. The monitor 11 is covered by a nematic liquid crystal panel 12 provided in the top of the projection 8. Thus, the liquid crystal panel 12 can display a 3D image of the object 7.

While observing the 3D image, a surgeon can perform an operation on the object 7. The surgeon's line of vision aligns with the path along which the light reflected from the object 7 travels to the first reflector 9. This helps him or her to manipulate the microscope system with ease. Since both the light-receiving section and the light-emitting section are incorporated in the barrel 2, the surgeon can have a working space larger than otherwise.

FIG. 2 shows the second embodiment of the invention, which is a surgical microscope system, too. The components of this microscope system, which are similar or identical to those of the first embodiment (FIG. 1) are designated by the same numerals and will not be described in detail.

As shown in FIG. 2, the surgical microscope system has an arm 15 secured to the ceiling 13 of the operation room 14 and extending vertically downwards from the ceiling 13. The arm 15 comprises a fixed section 16 and a rotatable section 17. The fixed section 16 is connected to the ceiling 13. The rotatable section 17 is coupled to the fixed section 16 and can rotate around the axis P of the arm 15.

A projection 18 horizontally protrudes from the lower end portion of the rotatable section 17 of the arm 15. In other words, the projection 18 extends at right angles to the axis P of the arm 15. A barrel 20 is connected to the projection 18 by means of a connector 19 which can expand and contract in the direction of arrow X.

The barrel 20 contains an objective lens 3, a pair of magnification-varying optical units 4L and 4R, a pair of focusing lenses 5L and 5R, and a pair of imaging devices 6L and 6R. These components are arranged in the order mentioned, from an object 7 to be examined with the surgical microscope system. The barrel 20 is arranged in the path of the light reflected by the first reflector 9. A nematic liquid crystal panel 12 is provided in the top of the barrel 20 and located in the optical axis of the ocular lens 21.

A monitor 22 (i.e., a display) is provided in the ceiling 13, vertically aligned with the fixed section 16 of the arm 15. The fixed section 16 of the arm 15 contains an objective lens 23 which opposes the monitor 22. The rotatable section 17 of the arm 15 contains an image rotator 24 and a third reflector 25. The objective lens 23 transmits an image to a focusing lens 26 provided in the connector 19, via the image rotator 24 and the third reflector 25, both incorporated in the rotatable section 17. The focusing lens 26 is composed of a focusing system so that the image is not deteriorated when the connector 19 is expanded or contracted.

The color video signals generated by the image-forming circuits of the devices 6L and 6R are supplied to the monitor 22, which displays a color image of the object 7. The color image is transmitted to the third reflector 25 through the objective lens 23 and the image rotator 24. The third reflector 25 transfers the image to the focusing lens 26 provided in the top portion of the barrel 20. The color image is transferred hence to the second reflector 10 contained also in the top portion of the barrel 20. The second reflector 10 applies the image onto the first reflector 9, which in turn applies the image to the ocular lens 21. The color image of the object 7 is thereby displayed on the liquid crystal panel 12.

Therefore, the second embodiment is advantageous in the same respects as the first embodiment. Moreover it is advantageous in another respect. Since the monitor 22 is provided in the ceiling 13 of the operation room 14, the barrel 20 is small and light enough to be moved with little force, which enhances the operability of the surgical microscope system.

Figure 4:
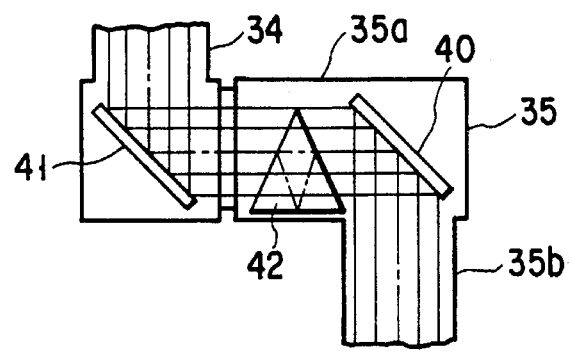
FIG. 4 is a side view of the microscope system shown in FIG. 3, as seen in the direction of arrow A in FIG. 3.

FIGS. 3 and 4 show the third embodiment of the invention, which is a surgical microscope system, too. The components of the microscope system, which are similar or identical to those of the first and second embodiments (FIGS. 1 and 2) are designated by the same numerals and will not be described in detail.

This surgical microscope system has a box 28 which contains a pair of magnification-varying optical units 4L and 4R, a pair of focusing lenses 5L and 5R, a pair of imaging devices 6L and 6R, a monitor 22 (i.e., a display), an objective lens 23 and a second beam splitter 39. The box 28 is located above the ceiling 13 of an operation room 14. More precisely, the box 28 is supported by rollers 29 and a sliding plate 30. The rollers 29 are in rolling contact with the upper surface of the ceiling 13, while the sliding plate 30 in sliding contact with the lower surface of the ceiling 13. Hence, the box 28 can be moved in a horizontal plane.

The ceiling 13 has an opening 31. The sliding plate 30 has a smaller opening. An arm 32 extends downwards from the bottom of the box 28, passing through the openings of the ceiling 13 and the sliding plate 30. The arm 32 comprises a fixed section 33, a connecting section 34 and a rotatable section 35. The fixed section 33 is formed integral with the box 28. The movable section 34 is partly inserted in the fixed portion 33 and can be moved up and down. The rotatable section 35 is connected to the lower end of the movable section 34, and can rotate around its axis P.

As shown in FIG. 4, the rotatable section 35 of the arm 32 is bent and shaped like an inverted L. It comprises a horizontal portion 35a and a vertical portion 35b. A projection 36 protrudes from the lower end of the vertical portion 35b, extending at right angles to the axis of the vertical portion 35b. A barrel 37 is connected to the projection 36.

The box 28 and the arm 32 form a light-guiding path. A first beam splitter 38 is located in the light-guiding path, at the lower end of the arm 32. The box 28 contains a second beam splitter 39.

The bent portion of the rotatable section 35 of the arm 32 contains a second reflector 40. The lower end portion of the movable section 34 contains a third reflector 41. The horizontal portion 35a contains an image rotator 42, which is positioned between the second reflector 40 and the third reflector 41. An objective lens 3 is provided at the lower end of the vertical portion 35b. The objective lens 3 guides the light reflected from an object 7 to the second reflector 40, which in turn applies the light onto the image rotator 43. The light is hence applied onto the third reflector 41 and then onto the second beam splitter 39 contained in the box 28.

In the box 28, the light output from the second beam splitter 39 is applied to the imaging device 6L through the magnification-varying optical unit 4L and the focusing lens 5L, and is applied also to the imaging device 6R through the magnification-varying optical unit 4R and the focusing lenses 5R. The color video signals generated by the imaging devices 6L and 6R are supplied to the monitor 22. The monitor 22 displays a color image of the object 7.

The color image is applied via the objective lens 23 onto the second beam splitter 39, which guides the image to the third reflector 41. The third reflector 41 transfers the image to the second reflector 40 via the image rotator 42. The second reflector 40 guides the image to the first beam splitter 38. The image reflected by the first beam splitter 38 is focused by the focusing lens 26, and applied by the first reflector 9 onto the ocular lens 21.

Therefore, the third embodiment is advantageous in the same respects as the first embodiment. Moreover, it is advantageous in two more aspects. First, since the photographing unit is provided above the ceiling 13, the barrel section is small and light enough to be moved with little force, enhancing the operability of the surgical microscope system. Second, since the beam splitters 38 and 39 can transmit both the light reflected from the object 7 and the light emitted from the monitor 22, the optical system for receiving observation light and the optical system for emitting observation light can share some components, which renders the microscope system even more simple and even lighter.

FIGS. 5 and 6 show a first modification of surgical microscope system according to the present invention. More specifically, FIG. 5 is a schematic representation of the modified system, and FIG. 6 a block diagram illustrating the electric unit used in the modified system.

As shown in FIG. 5, the modified microscope system has a barrel 50. The barrel 50 contains an objective lens 51, a pair of magnification-varying optical units 52L and 52R, a pair of focusing lenses 53L and 53R, and a pair of ocular lenses 54L and 54R. These components are arranged in the order mentioned, from an object 55 which is undergoing operation and which is being examined through the microscope. The optical unit 52L, the focusing lens 53L and the ocular lens 54L constitute the left optical unit 56L. The optical unit 52R, the focusing lens 53R and the ocular lens 54R constitute the right optical unit 56R.

A semitransparent mirror 57 is located in the optical path of the left optical unit 56L. Provided in the path of the light reflected by the mirror 57 are a focusing lens 58 and an imaging device 59. A quick return mirror 60 is positioned in the optical path of the right optical unit. Provided in the path of the light reflected by the mirror 60 are a relay lens 61 and a monitor 62. The quick return mirror 60, the relay lens 61 and the monitor 62 constitute a second observation system.

The quick return mirror 60 can be driven by a rotary solenoid 71 (later described), between two positions indicated by solid lines and broken lines in FIG. 5. The monitor 62 is designed to display the image of the object 55 photographed by the imaging device 59. An ND filter 63 is provided in the optical path of the right optical unit 56R, for adjusting the amount of light applied to the magnification-varying optical unit 52R to the amount of light applied to the magnification-varying optical unit 52L of the left optical unit 56L.

Provided outside the barrel 50 is an ultrasonic position sensor 64 comprising a receiver 65 and a transmitter 68. The transmitter 68 is attached to the band 67 wrapped around the wrist of a surgeon. The sensor 64 is electrically connected to a comparator 70 which is connected to a memory 69 for storing data representing a predetermined distance. An output signal of the comparator 70 is supplied to a driver (not shown), which drives a rotary solenoid 71.

Thus, when the surgeon moves his or her hand 66 away from the view filed 72 in order to replace the surgical instrument with another, the ultrasonic position sensor 64 detects this fact. That is, the comparator 70 compares the distance detected by the sensor 64 with the distance (e.g., 50 cm) stored in the memory 69. If the distance detected is more than 50 cm, it is assumed that the surgeon is no longer performing the operation, and the rotary solenoid 71 is driven. The quick return mirror 60 is thereby moved to the position indicated by the broken lines (FIG. 5). The focusing lens 58 focuses the light reflected by the semitransparent mirror 57 onto the imaging device 59. The image formed by the device 59 is displayed by the monitor 62. Due to the cooperation of the mirror 60, the focusing lens 53R and the ocular lens 54R, the surgeon can see the image formed by the imaging device 59.

The second observation system comprising the quick return mirror 60, the relay lens 61 and the monitor 62 has a view field 73 which is larger than the view field 72 of the microscope. The surgeon can therefore see the surgical instrument held in his or her hand 66 in the view field 73, provided his or her hand 66 remains a little more than 50 cm distance from the barrel 50. This enables the surgeon to recognize the instrument he or she is holding in their hand. When the surgeon resumes operation on the object 55, the distance between the hand 66 and the barrel 50 decreases to less than 50 cm. The rotary solenoid 71 is de-energized, and the quick mirror 60 returns to the original position, allowing the light from the magnification-varying optical unit 52R to reach the ocular lens 54R via the focusing lens 53R, whereby the surgeon can observe the magnified object 55 with the microscope.

The modified microscope system shown in FIGS. 5 and 6 is used exactly in the same way as a conventional surgical microscope, except when the instrument is replaced with another. This modified microscope system can be manufactured merely by coupling the second observation system and the ultrasonic position sensor 64 to a surgical microscope of the known type.

Figure 7:
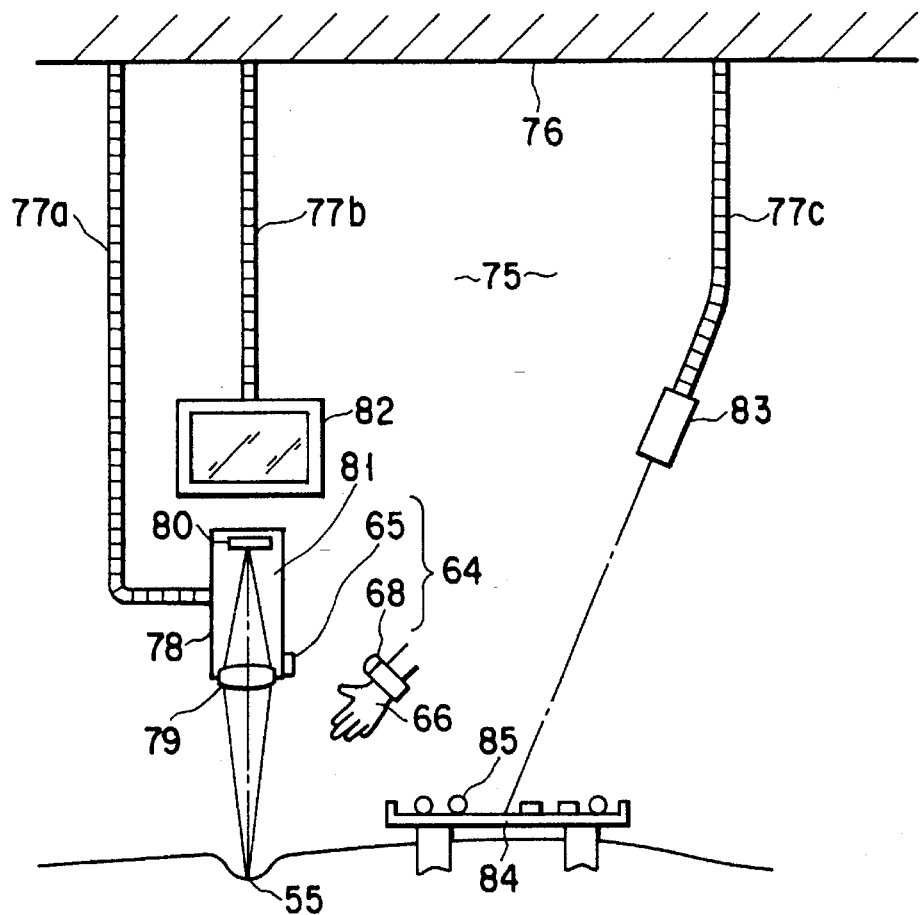
FIG. 7 is a schematic representation of the second modified microscope system according to the invention.
Figure 8:
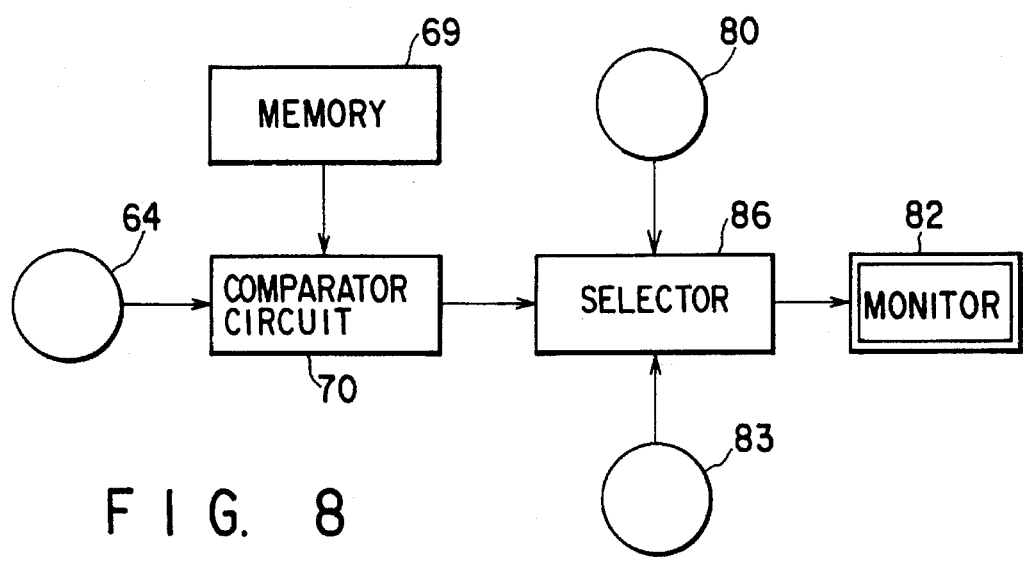
FIG. 8 is a block diagram of the electric unit used in the second modified microscope system.

FIGS. 7 and 8 show a second modification of the surgical microscope system according to the invention. To be more precise, FIG. 7 is a schematic representation of the second modified system, and FIG. 8 is a block diagram illustrating the electric unit used in the second modified system.

As shown in FIG. 7, the second modification has three arms 77a, 77b and 77c which can be bent in any direction. The arms 77a, 77b and 77c are connected at one end to the ceiling 76 of an operation room 75 and are suspended therefrom. A barrel 78 is connected to the other end of the first arm 77a. The barrel 78 contains an observation optical unit 81 which comprises an objective lens 79 and an imaging device 80. A monitor 82 is connected to the other end of the second arm 77b. A monitor camera 83, such as a TV camera, is connected to the other end of the third arm 77c. A tray 84 is located below the monitor camera 83. Placed on the tray 84 are surgical instruments 85 of various types. The camera 83 keeps photographing the tray 84.

As in the first modified microscope system, an ultrasonic position sensor 64 is provided outside the barrel 78. The sensor 64 comprises a receiver 65 and a transmitter 68. The receiver 65 is mounted on the outer surface of the barrel 78, and the transmitter 68 is attached to the band wrapped around the wrist of the surgeon. The sensor 64 and the transmitters 68 cooperate to measure the distance between the surgeon's hand 66 and the barrel 78. As shown in FIG. 8, the sensor 64 is electrically connected to a comparator circuit 70. The comparator circuit 70 is connected to a memory 69 which stores data representing a predetermined distance. The circuit 70 is designed to compare the distance detected by the sensor 64 with the predetermined distance stored in the memory 69 and to output a signal when the distance detected by the sensor 64 reaches or becomes longer than the predetermined distance. The signal is supplied to a selector 86. In response to the signal, the selector 86, which usually selects the video signal from the imaging device 80 in the barrel 78, selects the video signal from the monitor camera 83 instead. The video signal selected is supplied to the monitor 82.

Assume the surgeon moves his or her hand 66 away from the barrel 78 in order to replace the surgical instrument with another. When the distance the sensor 64 measures reaches the predetermined distance or becomes longer, the comparator circuit 70 generates a signal. In response to this signal, the selector 86 selects the view signal supplied from the monitor camera 83 and supplies the video signal to the monitor 82. The monitor 82 therefore displays the images of the surgical instruments 85 placed on the tray 84, instead of the magnified image of the object 55. Seeing the images of the instruments 85 displayed by the monitor 82, the surgeon can select one of the instruments 85 which he or she wants to use, without turning his or her face away from the object 55 to the tray 84.

When the surgeon moves his or her hand 66 (now holding the newly selected instrument) toward the object 55, to a position less distant from the barrel 78 than the predetermined distance, the selector 86 automatically selects the video signal supplied from the imaging device 80. As a result, the monitor 82 displays the magnified image of the object 55. The surgeon can then resume operation on the object 55.

The third arm 77c may be bent to direct the monitor camera 83 to a CT or MRI picture taken of the object 55 before the operation. In this case, the surgeon can have the CT or MRI image displayed on the monitor 82, merely by moving his or her hand 66 away from the barrel 78. The surgeon need not turn his or her face away from the object 55.

Figure 9:
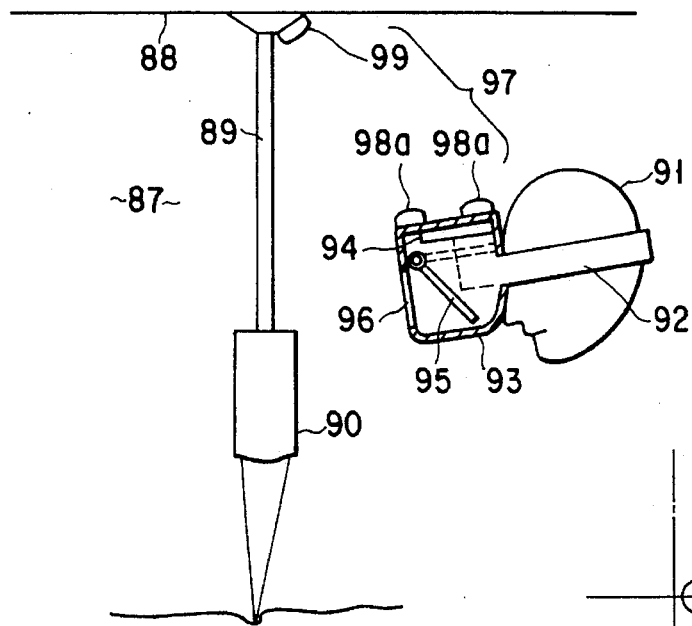
FIG. 9 is a schematic representation of the third modified microscope system according to the invention.
Figure 10:
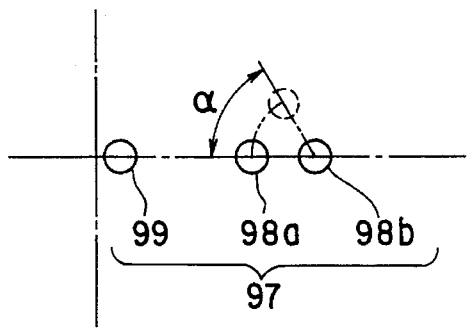
FIG. 10 is a block diagram of the electric unit used in the third modified microscope system.

FIGS. 9 and 10 illustrates a third modification of the surgical microscope system according to the present invention. More precisely, FIG. 9 schematically shows this modified system, and FIG. 10 shows a block diagram of the electric unit used in the second modified system.

As shown in FIG. 9, the third modification comprises a support shaft 89 and a barrel 90. The support shaft 89 is suspended from the ceiling 88 of an operation room 87. The barrel 90 is connected to the lower end of the support shaft 89 and contains an observation optical unit (not shown). The modified microscope system further comprises a head-mount display 92. The head-mount display 92 has a housing 93, a monitor 94, a quick return mirror 95, a window 96 and two ultrasonic transmitters 98a and 98b. The monitor 94 and the mirror 95 are contained in the housing 93. More specifically, the monitor is secured to the top wall of the housing 93, and the mirror 95 is hinged to the front wall of the housing 93 and can rotate between two positions indicated by solid lines and broken lines. The window 96 is made in the front wall of the housing 93. Through the window 96 the surgeon can see anything located in front of the head-mount display 92, as long as the quick return mirror 95 remains in the position indicated by the broken lines.

Both ultrasonic transmitters 98a and 98b are mounted on the outer surface of the top wall of the housing 93. An ultrasonic receiver 99 is mounted on the ceiling 88 and located right above the barrel 90. The transmitters 98a and 98b and the receiver 99 constitute an ultrasonic position sensor 97. The transmitters 98a and 98b and the receiver 99 are positioned as illustrated in FIG. 10 when they are viewed from the above. So positioned, these components 98a, 98b and 99 cooperate to detect not only the distance between the barrel 90 and the head-mount display 92, but also the angle a between the surgeon's line of vision and the line connecting the second transmitter 98b.

The distance and the angle α, both detected by the ultrasonic position sensor 97, are compared with a predetermined distance and a predetermined angle which are stored in a memory (not shown). When the distance detected by the sensor 97 is equal to or longer then the predetermined distance, or when the angle α is greater than the predetermined angle, the quick return mirror 95 is automatically rotated to the position indicated by the broken lines.

To see the magnified image of the object, the surgeon wears the head-mount display 92. As long as the surgeon stays close to the barrel 90 and also keeps facing the object, the quick return mirror 95 remains in the position indicated by the solid lines, reflecting the magnified image displayed by the monitor 94 to the surgeon's eyes. Hence, the surgeon can see the magnified image of the object he or she is treating. In order to see anything else, he or she only needs to move away from the barrel 90 or to turn his head in the direction of that thing. The surgeon need not touch the head-mount display 92; his or her hands can therefore be kept clean.

Figure 12:
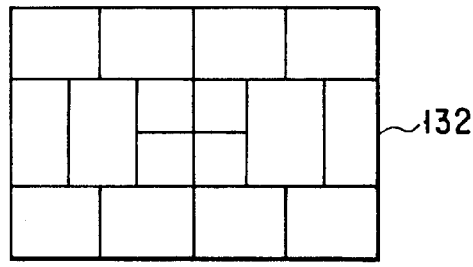
FIG. 12 is a diagram for explaining the operation of the microscope system shown in FIG. 11.
Figure 13:
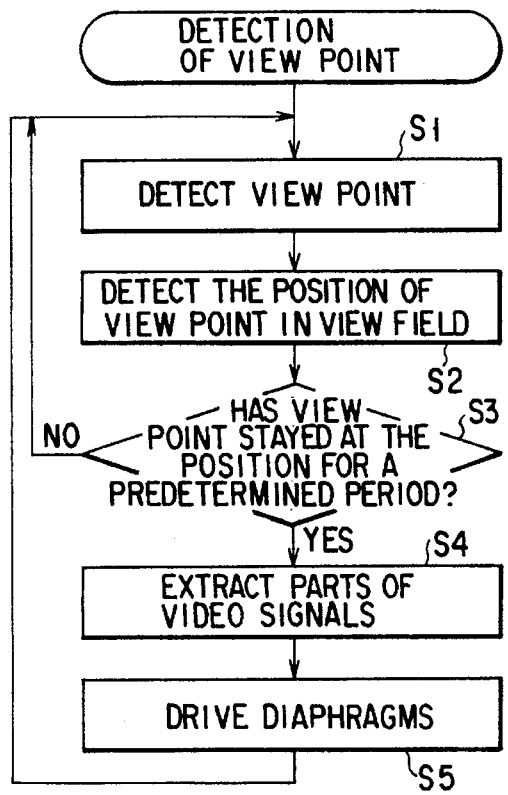
FIG. 13 is a flow chart representing the operation of the microscope system shown in FIG. 11.
Figure 11:
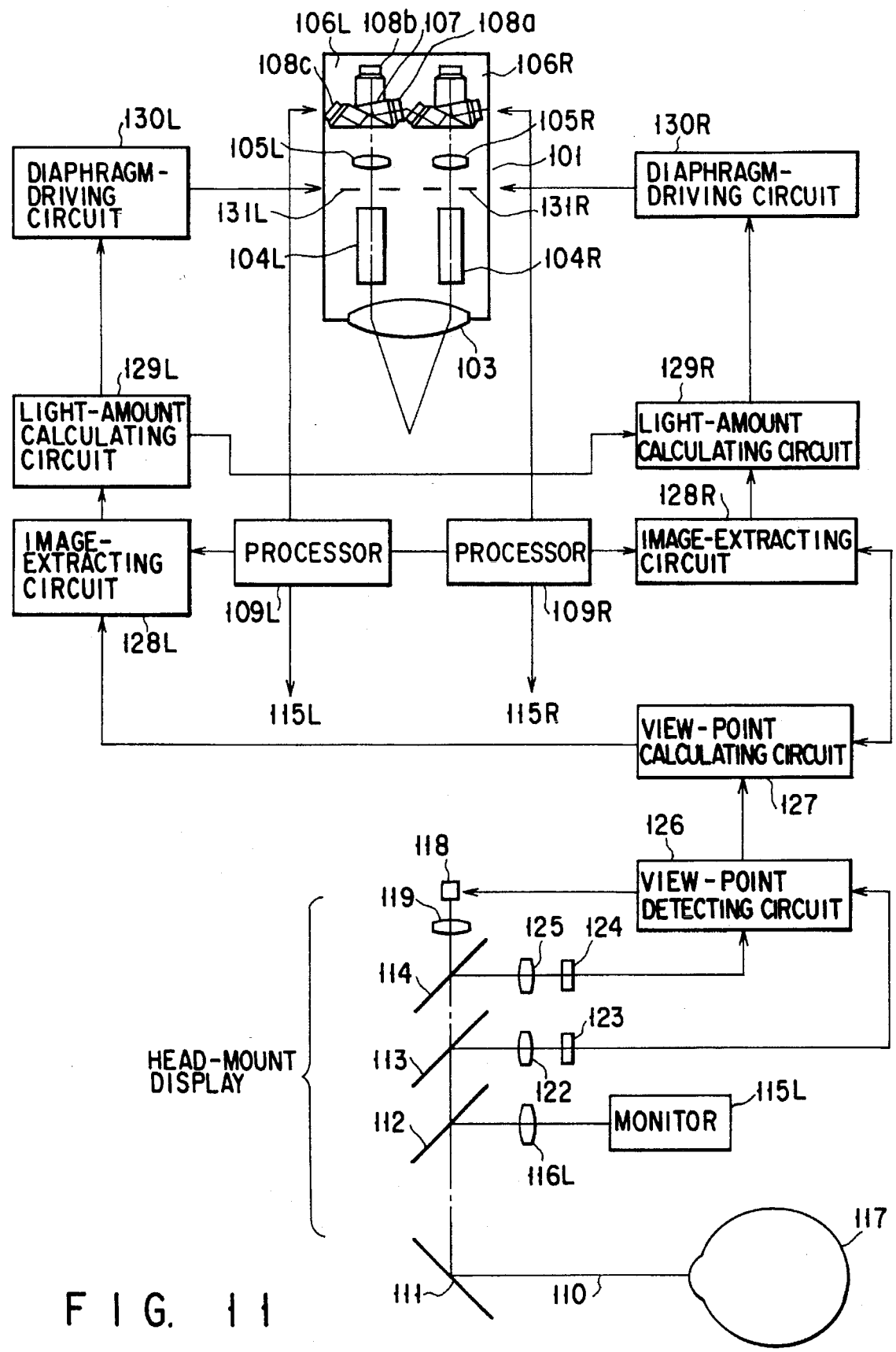
FIG. 11 is a block diagram illustrating a surgical microscope system according to a fourth embodiment of the present invention.

FIGS. 11 to 13 show a fourth embodiment of this invention, which is a surgical microscope system. FIG. 11 is a block diagram, FIG. 12 is a diagram explaining the operation of this microscope system, and FIG. 13 is a flow chart representing the operation of the system.

As shown in FIG. 11, the surgical microscope system comprises a barrel 101 and a head-mount display 102. The barrel 101 contains an objective lens 103, a pair of magnification-varying optical units 104L and 104R, a pair of focusing lenses 105L and 105R, and a pair RGB imaging devices 106L and 106R. These components are arranged in the order mentioned, from an object (not shown) which is undergoing operation and which is being examined through the microscope.

The RBG imaging devices 106L and 106R comprise each a color-resolving prism 107, a R-imaging element 108a, a G-imaging element 108b, and a B-imaging element 108c. The imaging devices 106L and 106R are connected to processors 109L and 109R, which in turn are connected to monitors 115L and 115R (later described). The processors 109L and 109R comprises each a circuit for driving the corresponding RGB imaging device, an amplifier (not shown) for amplifying the signals output from the RGB imaging device. Each processor further comprises a low-pass filter, a white-balance circuit, a γ correction circuit, a processing circuit and an image-forming circuit for generating an RGB video signal.

The head-mount display 102 has a left-eye path 110. Located in the the left-eye path 110 are: a mirror 111 for reflecting all incident light, a dichroic mirror 112 for reflecting visible light only, and two semitransparent mirrors 113 and 114. The image displayed by the monitor 115L is projected onto the cornea of the surgeon's left eye 117 via a lens 116L and the dichroic mirror 112.

The head-mount display 102 has an IRLED 118 and a projection lens 119. The infrared ray emitted by the IRLED 118 is applied to the mirror 111 through the projection lens 119, the semitransparent mirror 114, the semitransparent mirror 113 and the dichroic mirror 112. The mirror 111 reflects the infrared ray and applies it to the cornea of the surgeon's left eye 117. A Purkinje-effect image formed as the light is reflected by the rear surface of the lens is applied to a lens 122 by the mirror 111, the dichroic mirror 112 and the semitransparent mirror 113. The Purkinje-effect image is detected by a PSD 123 which is located in the optical axis of the lens 122. Another PSD 124 is located in the optical axis of a lens 125 and set in a position conjugate to the iris of the surgeon's left eye 117. The PSD 124 receives the light reflected from the iris and applied by the mirror 111, the dichroic mirror 112, the semitransparent mirrors 113 and 114 and the lens 125, and detects the center of the iris. Both PSDs 123 and 124 are two-dimensional position detectors.

The PSDs 123 and 124 are connected to a view-point detecting circuit 126, which is connected to a viewpoint calculating circuit 127. The view-point calculating circuit 127 is connected to a left image-extracting circuit 128L and a right image-extracting circuit 128R. The image-extracting circuits 128L and 128R are connected to a light-amount calculating circuit 129L and a light-amount calculating circuit 129R, respectively. The light-amount calculating circuits 129L and 129R are connected to diaphragm-driving sections 130L and 130R. The sections 130L and 130R are designed to drive diaphragms 131L and 131R which are arranged in the left and right optical paths in the barrel 101, respectively.

How the surgical microscope system according to the fourth embodiment operates will be explained with reference to FIGS. 12 and 13.

The signal output by the PSD 123 and representing the Purkinje-effect image is input to the view-point detecting circuit 126. The signal output by the PSD 124 and representing the center of the iris is input to the view-point detecting circuit 126, too. In Step S1, the circuit 126 detects a view point from the output signals of the PSDs 123 and 124. In Step S2, the view-point calculating circuit 127 determines the position which the view point assumes in the fields indicated generally by reference numeral 132.

Then, in Step S3, it is determined whether or not the view point detected by the view-point detecting circuit 126 has stayed in that position for a predetermined period. If NO, the operation returns to Step S1. If YES, the operation goes to Step S4. In Step S4, the image-extracting circuit 128L extracts that part of the video signal from the processor 109L which corresponds to the field, and the image-extracting circuit 128R extracts that part of the video signal from the processor 109R. The parts of the video signals, extracted by the circuits 128L and 128R, are supplied to the light-amount calculating circuits 129L and 129R, respectively. In Step S5, the circuit 129L calculates the best possible amount of light to be applied to the focusing lens 105L through the diaphragm 131L, and generates a signal representing the amount of light calculated. Similarly, the circuit 129R calculates the best possible amount of light to be applied to the focusing lens 105R through the diaphragm 131R, and generates a signal representing the amount of light calculated. The output signals of the light-amount calculating circuits 129L and 129R are supplied to the diaphragm-driving sections 130L and 130R, respectively. In accordance with these signals, the sections 130L and 130R drives the diaphragms 131L and 131R. Meanwhile, the output signal of the circuit 129L is supplied to the circuit 128R, and the output signal of the circuit 129R to the circuit 128L, whereby their magnitude are rendered equal. The diaphragms 131L and 131R (AE) are independently driven for the left image and the right image, respectively. Further, the left image and the right image have no difference in brightness. Hence, a 3D image can be formed.

Figure 14:
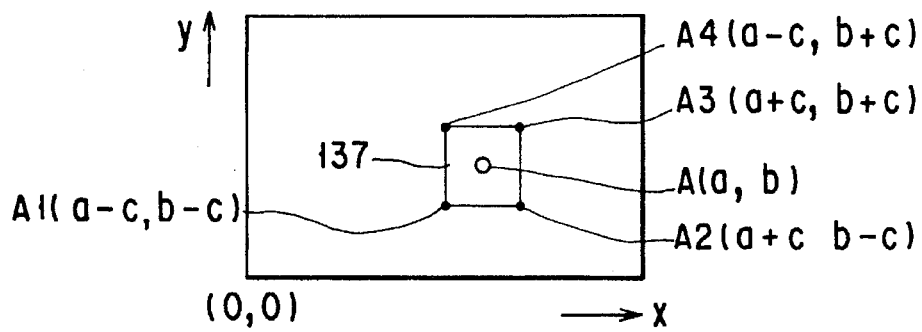
FIG. 14 is a diagram explaining the operation of a surgical microscope system according to a fifth embodiment of the invention.
Figure 15:
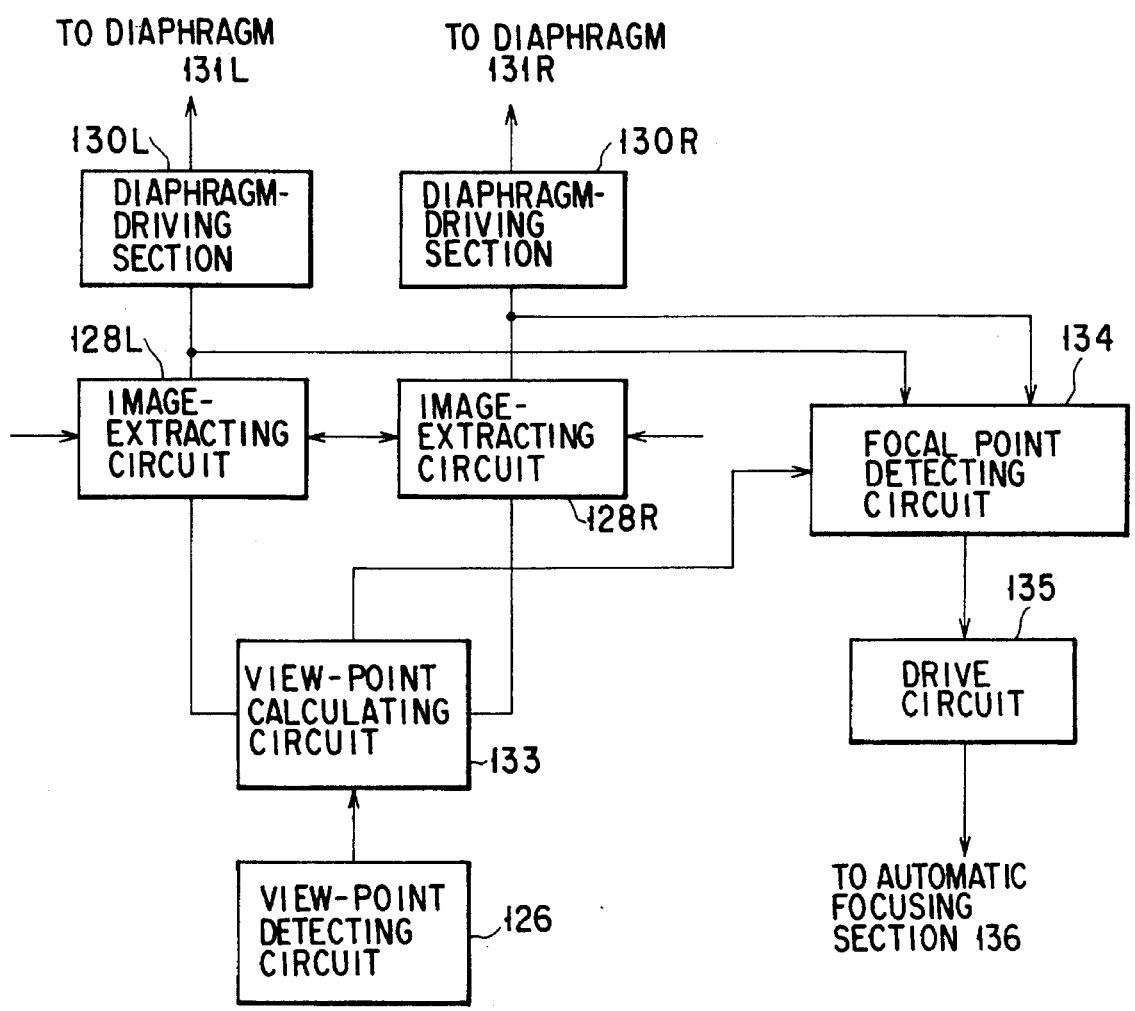
FIG. 15 is a block diagram of the electric unit incorporated in the microscope system of FIG. 14.

FIGS. 14 and 15 show a fifth embodiment of the invention, which is a surgical microscope system. FIG. 14 explains the operation of the microscope system, and FIG. 15 is a block diagram of the electric unit incorporated in the microscope system.

As can be understood from FIG. 15, the fifth embodiment is similar to the fourth embodiment in basic structure. It is characterized in three respects. First, a view-point detecting circuit 126 is connected by a view-point calculating circuit 133 to image-extracting circuits 128L and 128R. Second, a view-point calculating circuit 133 is connected to a focal point detecting circuit 134. Third, the focal point detecting circuit 134 is connected by a drive circuit 135 to an automatic focusing section 136.

Assume the view-point calculating circuit 133 determines that the view point is located at point A (a, b) as illustrated in FIG. 14. Then, the interest region 137 defined by four points A1, A2, A3 and A4 located around the point A is considered to be that part of the image to be extracted. Next, the best possible amounts of light to be applied to the left and right focusing lenses are calculated, and the diaphragm-driving sections 130L and 130R are driven accordingly to control the amounts of light supplied to the left and right focusing lenses. If the view point remains outside the interest region 137 for a predetermined period or longer, it will be regarded as a new view point.

The focal point detecting circuit 134 receives the signal supplied from view-point calculating circuit 133 and representing the position of the view point, and also the signals supplied from the image-extracting circuits 128L and 128R and representing the parts of the image extracted from the left and right images. The focal point detecting circuit 134 can easily detects a phase difference from these input signals. The phase difference is supplied to the drive circuit 135. The circuit 135 drives the automatic focusing section 136 in accordance with the phase difference. Automatic focusing (AF) is thereby accomplished.

FIG. 16 shows a surgical microscope system which is the sixth embodiment of this invention. The components similar or identical to those of the fourth embodiment will be designated at the same numerals and will not described in detail. RGB imaging devices 106L and 106R form a left image and a right image in cooperation with drive circuits 141L and 141R, amplifier circuits 142L and 142R and processors 143L and 143R.

The sixth embodiment has a view-point calculating circuit 127, too. The circuit 127 determines the position of the view point. Based on the position of the view point, a video signal is divided into two parts. The first part of the signal corresponds to the interest region defined of the view field, and the second part corresponds to the other region of the view field. A view-point light-amount calculating circuit 144L and an ambient light-amount calculating circuit 145L calculate the best possible amount of light to be applied to a left focusing lens. Likewise, a view-point light-amount calculating circuit 144R and an ambient light-amount calculating circuit 145R calculate the best possible amount of light to be applied to a right focusing lens. Drive circuits 141L and 141R supply sync signals to image-dividing circuits 148L and 148R. Upon receipt of a sync signal, the image-dividing circuit 148L supplies a switching signal to analog switches 146L and 147L. Upon receipt of a sync signal, the image-dividing circuit 148R supplies a switching signal to analog switches 146R and 147R. In the amplifier circuit 142L, an amplifier 149L amplifies that part of the video signal which corresponds to the interest region of the view field, while an amplifier 150L amplifies the other part of the video signal which corresponds to the other region of the view field. Similarly, in the amplifier circuit 142R, an amplifier 149R amplifies that part of the video signal which corresponds to the interest region of the view field, while an amplifier 150R amplifies the other part of the video signal which corresponds to the other region of the view field.

The amplifiers 149L, 149R, 150L and 150R are all gain-variable amplifiers. Their amplification factors are set in accordance with their associated operation circuits. The amplification factors of these four amplifiers are of such different values that the light amounts calculated by the operation circuits associated with the amplifiers 149L, 149R, 150L and 150R do not differ much so that the resultant left and right images may be similar in brightness.

The video signals generated by the processors 143L and 143R are supplied not only to the head-mount display (not shown) on a surgeon, but also to a time-divided 3D video signal generator 151. The generator 151 generates 3D video signals, which are supplied to a 3D monitor 152. The monitor 152 displays an image, which is applied through a liquid-crystal polarizing plate 153. As a result, a 3D image of the object the surgeon is treating. Not only the image part located at the interest region of the view field, but also the other image part around that image part can has appropriate brightness. In addition, there is no difference in brightness between the left image and the right image. Thus, a clear 3D image of the object can be formed.

FIG. 17 shows a drape, i.e., a sterilized cover. The drape comprises a bag 161, a ring 162 holding the rim of the bag 161, and a handle 163 connected to the ring 162. The ring 162 and the handle 163 have the structures shown in FIG. 18. The ring 162 is adhered to the rim of the bag 161. The ring 162 is made of elastic material and has a slit 165; it is a split ring. The ring 162 has two grooves 166 formed in the opposing ends, and also two stepped portions 167 protruding toward each other from the opposing ends. The handle 163 has one end portion fitted in the slit 165 of the ring 162—with its lower side set in abutment with the stepped portions 167 of the ring 162. This end portion of the handle 163 has two pins 168 protruding from the sides and held in the grooves 166 of the ring 162.

To wear the drape after having put on the head-mount display, the surgeon holds the handle 163, puts on the drape in the same way as he or she puts on a cap, thus covering the head-mount display with the drape, then pulls the handle 163 from the slit 165 of the ring 162. Once the handle 163 has been pulled, the ring 163 reduces its diameter due to its elasticity, fastening the drape steadfast to the head-mount display. Hence, the surgeon needs only to make a single action to wear the drape.

FIG. 19 shows the ring 164 and handle 169 of a modified drape. The ring 164 has a slit 165 and two semispherical recesses 168 formed in the opposing opposing ends. The handle 169 has a ball 170 at its one end. The ball 170 is set in the slit 156, partly inserted in the semispherical recesses 168. Thus, the handle 169 is removably connected the ring 164. To wear the drape after having put on the head-mount display, the surgeon holds the handle 169, puts on the drape in the same way as he or she puts on a cap, thus covering the head-mount display with the drape, then pulls the handle 169 from the slit 165 of the ring 164. Once the handle 169 has been pulled, the ring 164 reduces its diameter due to its elasticity, fastening the drape firmly to the head-mount display. The surgeon needs only to make a single action to wear the drape.

FIG. 20 shows the ring 171 and handle 175 of another modified drape. The ring 171 is made of elastic material and has a slit 172. A spring 173 is connected to the opposing ends of ring 171, biasing the ends toward each other. Two holes 174 are made in the upper surfaces of the ends of the ring 171. The handle 175 is made of a metal rod bent twice, having two intermediate portions crossing each other. The proximal portions of the metal rod constitute a grip 176. Both ends 177 of the metal rod are bent and inserted in the holes 174 of the ring 171.

When the grip 176 is squeezed in the direction of arrows (FIG. 20) against the force of the spring 173, the ends 177 of the metal rod are spaced apart, broadening the slit 172. Keeping the silt 172 open wide, the surgeon put on the drape, covering the head-mount display he or she wears and the releases the grip 176. The spring 173 pulls the ends of the ring 171 toward each other. The ring 171 reduces its diameter, fastening the drape steadfast to the head-mount display. To remove the handle 175 from the ring 171, the surgeon needs only to move the handle 175 upwards.

Although the bag and ring of the drape must be discarded once used, the handle 175 can be used repeatedly. This helps to reduce the price of the drape.

FIG. 21 shows another type of a drape. The drape has two sleeves 181 formed integral with the bag 178. As shown in FIG. 22, when the surgeon wears this drape, covering the head-mount display 179 he or she wears, the sleeves 181 cover the viewing barrels 181 of the head-mount display 179. Thus, the bag 178 covers the entire head-mount display 179 having the viewing barrels 180, so long as the surgeon keep wearing the drape.

Figure 24B:
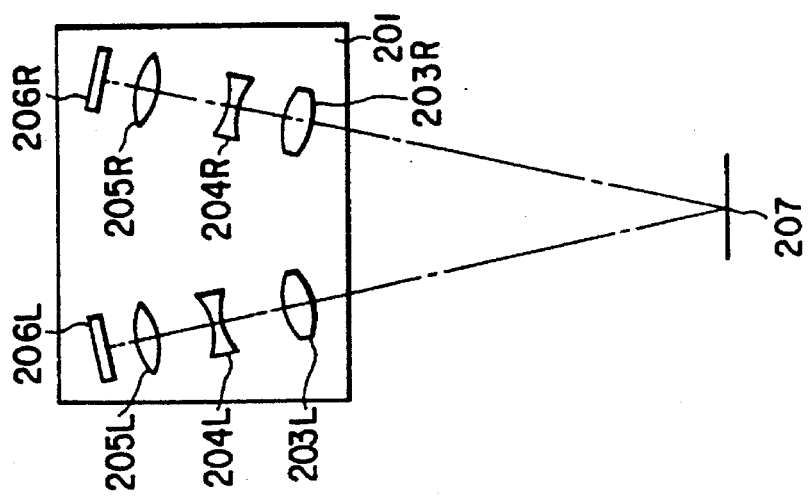
FIG. 24B is a side view, taken in the direction of line 24B—24B in FIG. 24A, schematically showing the system of FIG. 23.
Figure 24A:
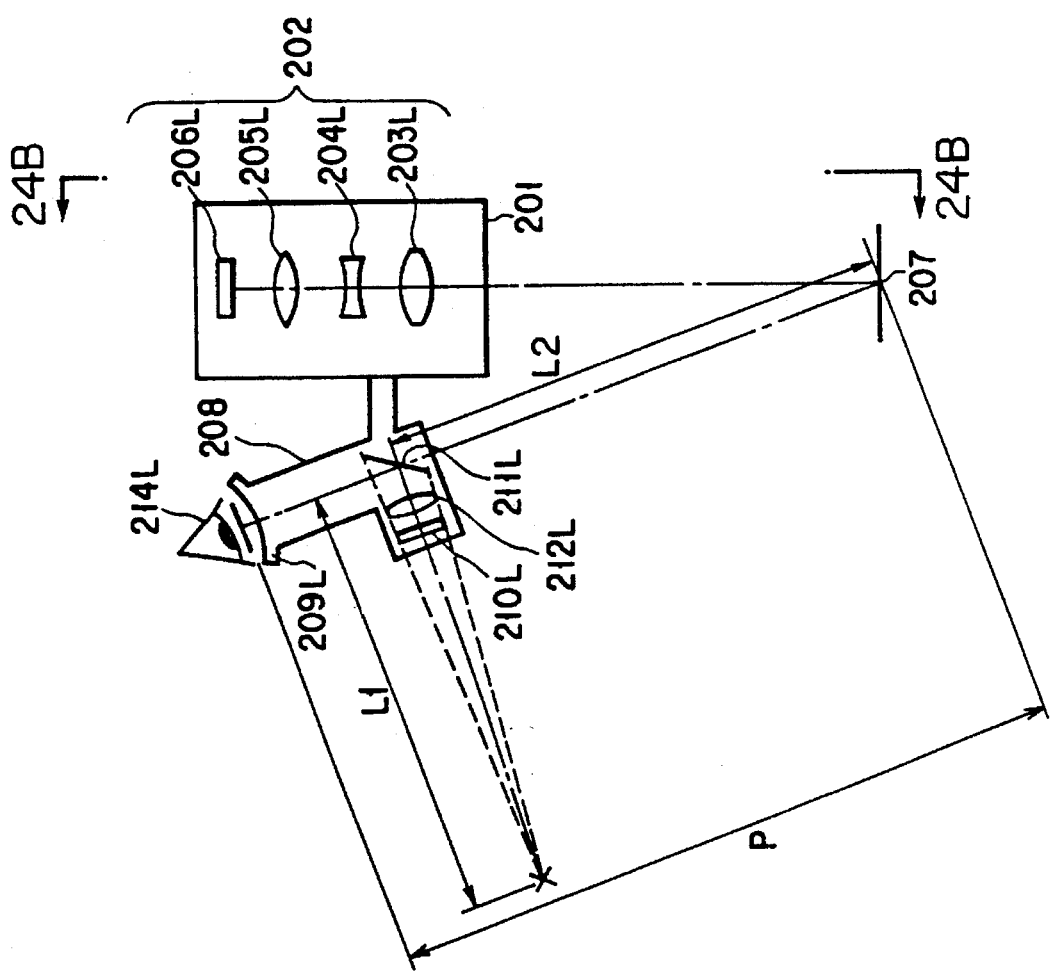
FIG. 24A is a front view schematically showing the system of FIG. 23.

FIGS. 23, 24A and 24B show a surgical microscope system which is the seventh embodiment of the present invention. As shown in FIG. 23, this system comprises a barrel 201 which contains a 3D imaging optical unit 202. The unit 202 comprises a pair of objective lenses 203L and 203R, a pair of magnification-varying optical units 204L and 204R, a pair of focusing lenses 205L and 205R, and a pair of imaging devices 206L and 206R. The components 203L, 204L, 205L and 206L are aligned in a line extending to an object 207 to be examined through the microscope system; they are arranged in the order mentioned, from the object 207. The components 203R, 204R, 205R and 206R are also aligned in a line extending to an object 207 to be examined through the microscope system; they are also arranged in the order mentioned, from the object 207.

The imaging devices 206L and 206R each comprise a color-splitting prism, an R-imaging element, a G-imaging element, and a B-imaging element. The imaging devices 206L and 206R generate R-, G- and B-signals. The R-, G- and B-signals are supplied to the monitors 210L and 210R. The monitors 210L and 210R display the color images of the object 207.

A branch barrel 208 is connected to one side of the barrel 201. Mounted atop the branch barrel 208 are two ocular sections 209L and 209R. These sections 209L and 209R can be moved toward and away from each other to adjust the distance between them to the distance S between the pupils of the eyes 214L and 214R of a surgeon who uses the microscope system.

The branch barrel contains both monitors 210L and 210R, a pair of mirrors 211L and 211R and a pair of projection lenses 212L and 212R. The mirrors 211L and 211R are positioned to apply the images displayed by the monitors 210L and 210R onto the ocular sections 209L and 209R. The projection lenses 212L and 212R are positioned to form virtual images of the monitor images at a distance L1 which is equal to the distance L2 between either mirror and the object 207. The ocular section 209L, the monitor 210L, the mirror 211L and the projection lens 212L constitute a left projection unit 213L. The ocular section 209R, the monitor 210R, the mirror 211R and the projection lens 212R constitute a right projection unit 213R.

When looking at the object 207 through the microscope system, the surgeon perceives that the projected image of the object 207 which he or she sees is located at a distance from his or her either eye which is equal to the distance P between either eye and the object 207. Assuming that the diameter E of the pupils is 25 mm or more, and that the distance S between the eyes 214L and 214R is 65 mm, the surgeon can see the image well, without adjusting the distance S.

Hence, the surgeon can feel that the object 207 is located at the same distance as when he or she sees the object 207 with naked eyes, while his or her line of vision extends to the object 207. The surgeon can therefore treat the object 207 with good sense of distance.

FIGS. 25 and 26 show a surgical microscope system which is the eighth embodiment of this invention. As shown in FIG. 25, the system has a support shaft 216, a barrel 217, a 3D imaging optical unit (not shown) and a 3D imaging device (not shown). The shaft 216 is suspended from the ceiling or the like of an operation room 215. The barrel 217 is attached to the support shaft 216 and contains the 3D imaging optical unit.

The surgical microscope system further comprises a head-mount display 219 which a surgeon wears to observe an object 225 by means of the system. The display 219 has a monitor 220, a lens-driving device 221 (FIG. 26), a projection lens 222, and two mirrors 223. The monitor 220 displays the image of the object 225 obtained by the 3D imaging device contained in the barrel 217. The lens 222 opposes the monitor 220 and can be moved by the lens-driving device 221, toward and away from the monitor 220. The mirror 223 is arranged in front of the projection lens 222, and the mirror 224 in front of the the surgeons eyes. Hence, the surgeon can observe the image the monitor 220 displays.

The surgical microscope system further has an ultrasonic position sensor which comprises a transmitter 226 and a receiver 227. The transmitter 226 is placed near the object 225, whereas the receiver 227 is located in front of the head-mount display 219.

While the surgeon, who wears the display 219, is working on the object 225, the ultrasonic position sensor detects the distance between the transmitter 226 located near the object 225 and the receiver 227 mounted on the display 219. A distance calculating section 228 (FIG. 26) calculates the distance between the object 225 and the surgeon's eyes, from the the distance the sensor has detected. The section 228 generates a signal representing the distance thus calculated and supplies the signal to the lens-driving device 221. The device 221 drives the projection lens 222 forward or backward in accordance with the distance detected by the ultrasonic position sensor. Driven by the device 221, the projection lens 222 forms an virtual image of the object 225 at the very position of the object 225. As a result, the surgeon can perceive the changes in the distance between the object 225 and his or her eyes, though he or she cannot see the object per se.

Figure 29:
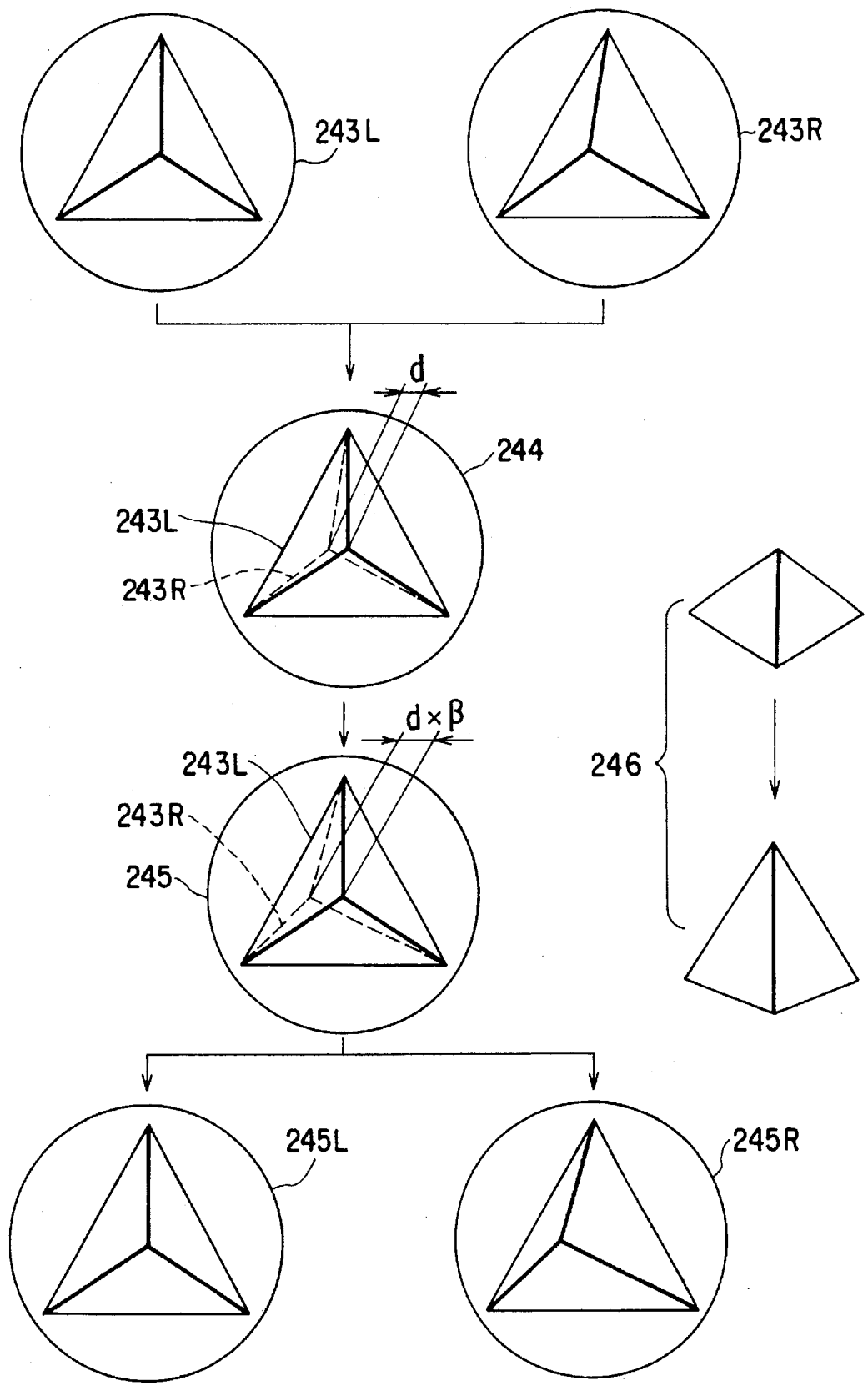
FIG. 29 is a diagram for explaining how to operate the fourth modified microscope system.

FIGS. 27, 28 and 29 shows a fourth modified surgical microscope system according to the present invention. More precisely, FIG. 27 shows the barrel 231 and image-processing section 233 of the modified system; FIG. 28 is a block diagram illustrating the electric unit incorporated in the modified system; and FIG. 29 is a diagram explaining how to operate the system.

As can be understood from FIG. 27, the barrel 231 contains an objective lens 232, a pair of focusing lenses 234L and 234R and a pair of imaging devices 235L and 235R. These components are arranged in the order mentioned, from an object 236 which a surgeon treats while observing it under the microscope system. As shown in FIG. 28, the image-processing section 233 contains two processors 237L and 237R.

The imaging devices 235L and 235R comprise each a color-splitting prism, a R-imaging element, a G-imaging element, and a B-imaging element. The devices 235L and 235R generate R-, G- and B-signals. The R-, G- and B-signals are sup plied to the processors 237L and 237R of the image-processing section 233, which generate color video signals representing the images of the object 236.

As shown in FIG. 28, the processors 237L and 237R are connected to an overlap-detecting circuit 238, motion-detecting circuits 239L and 239R, a parallax-detecting circuit 240 and a 3D calculation circuit 241. The processors 237L and 237R process the video signals supplied from the imaging devices 235L and 235R and generate video signals, which are supplied to the circuit 238, the circuits 239L and 239R, the circuit 240, and the circuit 241.

The overlap-detecting circuit 238 and both motion-detecting circuits 239L and 239R are connected to the parallax-detecting circuit 240, to supply position signals to the parallax-detecting circuit 240. The parallax-detecting circuit 240 is connected to the 3D calculation circuit 241, to supply an output to the circuit 241. Furthermore, a memory is connected to the 3D calculation circuit 241, to supply a variable data β to the circuit 241.

With reference to FIG. 29, it will be explained how the image-processing section 233 processes the video signals output from the imaging devices 235L and 235R. The overlap-detecting circuit 238 detects those parts of the images 235L and 235R which overlap. Then, the circuit 238 combines the the images 243L and 243R, forming a synthesized image 244. The motion-detecting circuit 239L detects the motion of the left image 243L, whereas the motion-detecting circuit 239R detects the motion of the left image 243R, thereby detecting a displacement between each of several points in left image 243L and the corresponding point in right image 243R. As indicated the broken lines, the right image 243R is displaced by the distance d with respect to the left image 243L. The 3D calculation circuit 241 multiplies the distance d between any corresponding points in the images 243L and 243R, i.e., the output data of the parallax-detecting circuit 240, by the variable data β read from the memory 242, thereby generating a video signal representing a synthesized image 245 shown in FIG. 29. This video signal is processed, dividing the synthesized image 244 a left image 245L and a right image 245R. These images 245L and 245R form a 3D image of the object. As shown at 246 in FIG. 29, the 3D image, i.e., a triangular pyramid, is β times larger than a 3D image which might be formed if the distance d were not multiplied by the variable data β.

Hitherto, mirrors and prisms must be moved and rotated in order to alter the aspect of a 3D image. In the fourth modified surgical microscope system, the image-processing section 233 processes video signals as explained above, successively altering the aspect of a 3D image. The barrel 231 need not contain mechanisms for moving or rotating optical components. The barrel 231 can therefore be made smaller than otherwise, to give the surgeon a sufficient working space. Hence, the fourth modified surgical microscope system has sufficient operability.

Figure 30:
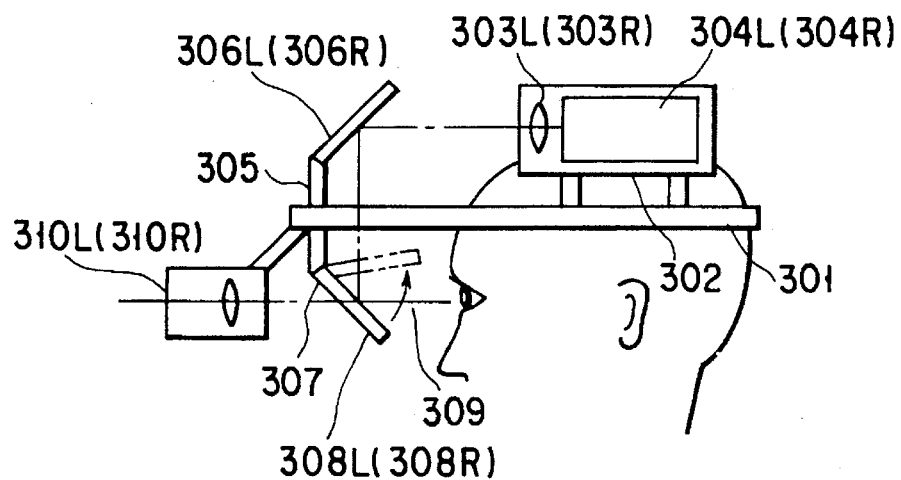
FIG. 30 is a side view of the head-mount display included in a surgical microscope system according to an ninth embodiment of this invention.
Figure 31:
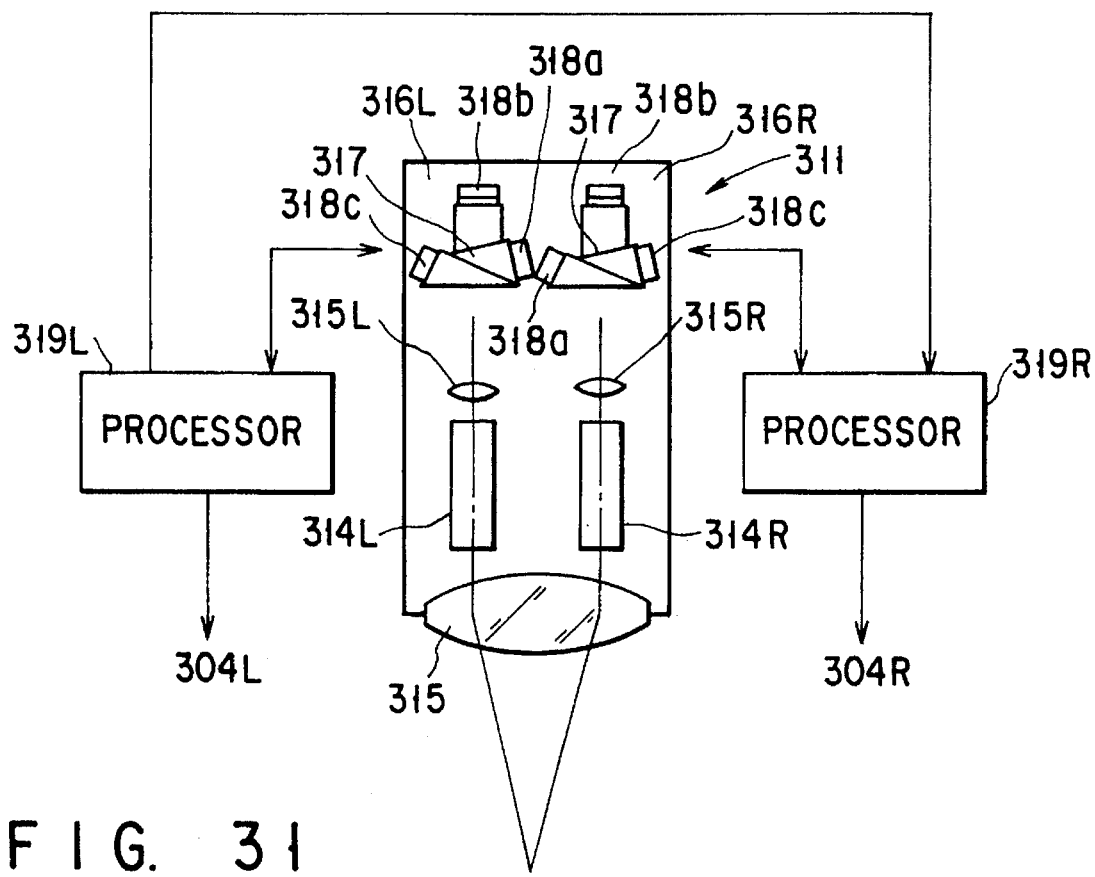
FIG. 31 is a schematic representation of the ninth embodiment.

FIGS. 30 and 31 show a surgical microscope system according to the ninth embodiment of this invention. More precisely, FIG. 30 is shows the head-mount display used in the system, and FIG. 31 shows the barrel 311 of the system.

As shown in FIG. 30, the head-mount display comprises a headband 301, a display section 301, a mirror support 305, fixed mirrors 306L and 306R, rotatable mirrors 308L and 308R, and magnifying mirrors 310L and 310R.

The display section 301 is secured to the headband 301. The display section 301 has a pair of lenses 303L and 303R and a pair of displays 304L and 304R. The mirror support 305 is connected to the front part of the headband 301 and extends vertically. The fixed mirrors 306L and 306R are secured to the upper end of the mirror support 305 and inclined at 45° to the displays 304L and 304R, respectively. The rotatable mirrors 308L and 308R are mounted on an axle 307 secured to the lower end of the mirror support 305 and can be rotated around the axle 307 between upper and lower positions. While in the lower position, the rotatable mirrors 308L and 308R remain inclined at 45° to the line of vision of the surgeon wearing the head-mount display. While in the upper position, the rotatable mirrors 308L and 308R remain outside the surgeon's line of vision. As long as the mirrors 308L and 308R stay in the lower position, the surgeon can see the images displayed by the displays 304L and 304R. As long as the mirrors 308L and 308R stays in the upper position, the surgeon can see the images magnified by the magnifying mirrors 310L and 310R which are arranged in the optical axes of the rotatable mirrors 308L and 308R and which are used as optical observation means.

The barrel 311 will be described, with reference to FIG. 31. The barrel 311 contains an objective lens 313, a pair of magnification-varying optical units 314L and 314R, a pair of focusing lenses 315L and 315R, and a pair of imaging devices 316L and 316R. These components are arranged in the order mentioned, from an object (not shown) which the surgeon treats while observing it under the microscope system.

The imaging devices 316L and 316R comprise each a color-resolving prism 317, an R-imaging element 318a, a G-imaging element 318b, and a B-imaging element 318c. The devices 316L and 316R generate R-signals, G-signals and B-signals. These signals are supplied to processors 319L and 319R which are provided outside the barrel 317. The processors 319L and 319R comprise each a drive circuit for driving the corresponding imaging device and an image-forming circuit for processing the R-, G- and G-signals to generate a color video signal representing the image of the object.

In the barrel 317, the light reflected from the object is applied to the color-resolving prism 317 of each imaging device through the objective lens 313, the magnification-varying optical unit and the focusing lens. The prism 317 resolves the light into a red beam, a green beam and a blue beam, which are applied to the R-imaging element 318a, the G-imaging element 318b and the B-imaging element 318c, respectively. The imaging elements 318a, 318b and 318c generate R-, G- and B-signals.

The R-, G- and B-signals, thus generated by the imaging device 316L, are input to the processor 319L, and the processor 319L generates a color video signal, which is supplied to the display 304L, whereby the display 304L displays a color image of the object. Meanwhile, the R-, G- and B-signals generated by the imaging device 316R are input to the processor 319R, and the processor 319R generates a color video signal, which is supplied to the display 304R, whereby the display 304R displays a color image of the object.

The image displayed by the display 304L is applied to the surgeon's left eye via the lens 303L, the fixed mirror 306L and the rotatable mirror 308L. Similarly, the image displayed by the display 304R is applied to the surgeon's right eye via the lens 303R, the fixed mirror 306R and the rotatable mirror 308R. Hence, the surgeon sees a 3D image of the object.

The 3D image may disappear while the surgeon is performing operation on the object, due to, for example, malfunction of an electric part or disconnection of a signal cable. In this case, the surgeon needs only to rotate the rotatable mirrors 308L and 308R to the upper position, in order to observe the object. Once the mirrors 308L and 308R have been so rotated, the images magnified by the magnifying mirrors 310L and 310R are applied to the surgeon's eyes. Thus, the surgeon can continue the operation. Simple action of rotating the mirrors 308L and 308R upwards around the axle 307 enables the surgeon to observe a magnified 3D image of the object and, hence, to keep on performing the operation, even if an electrical trouble occurs in the microscope system.

Figure 32:
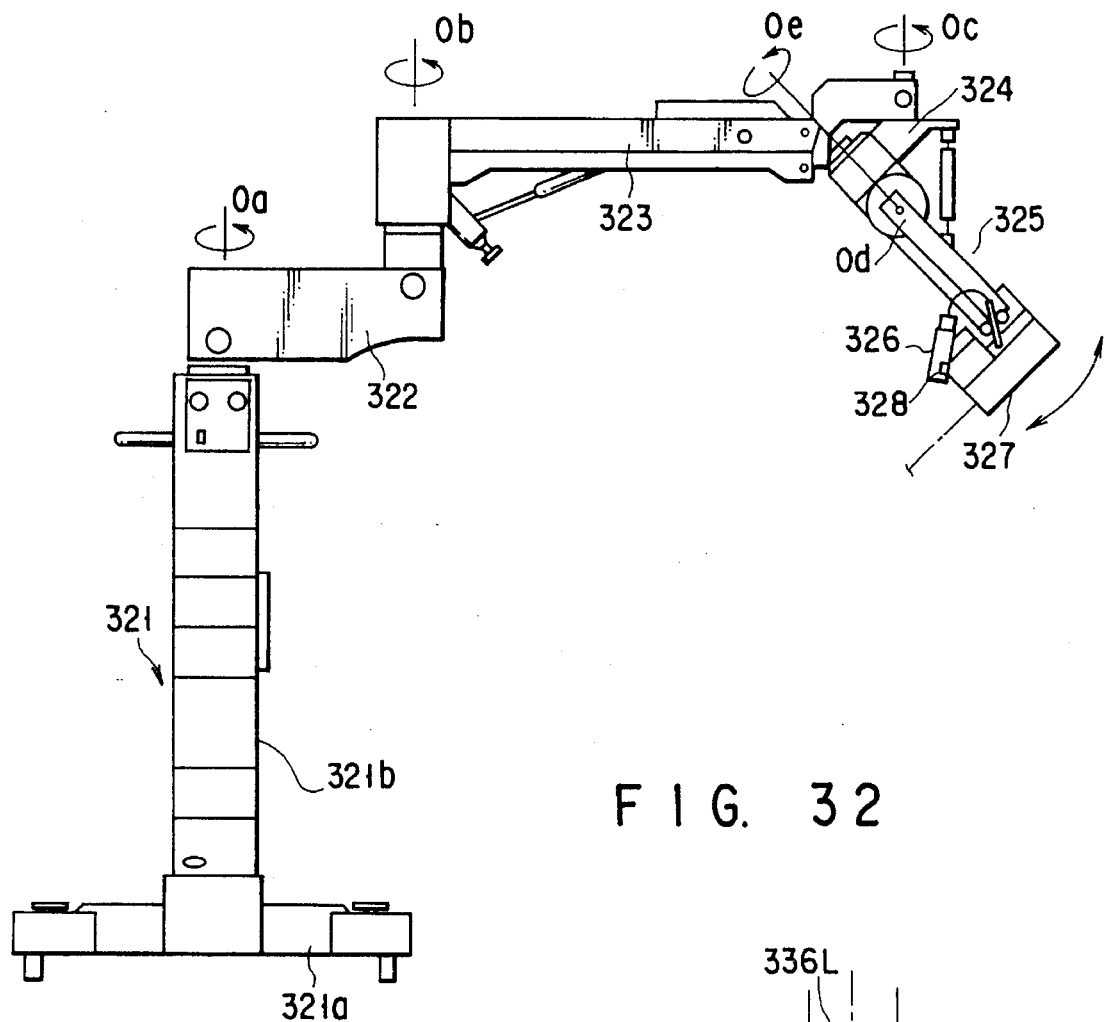
FIG. 32 is a side view of the barrel-supporting unit incorporated in a surgical microscope system according to a tenth embodiment of the invention.
Figure 33:
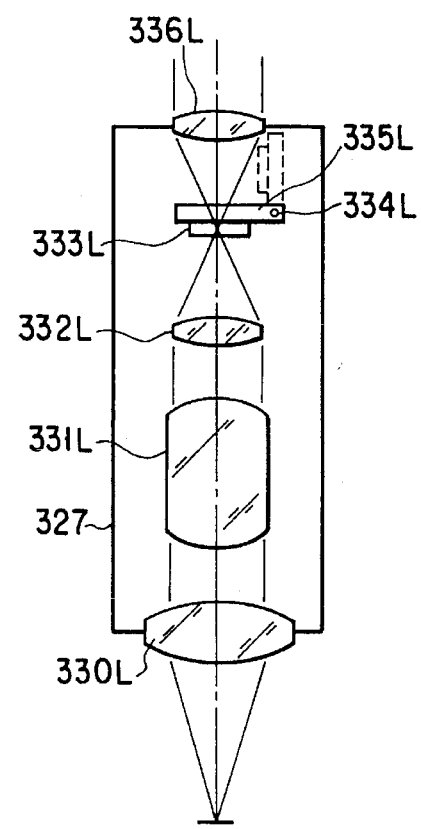
FIG. 33 is a schematic representation of one of the two optical systems used in the tenth embodiment.
Figure 34A:
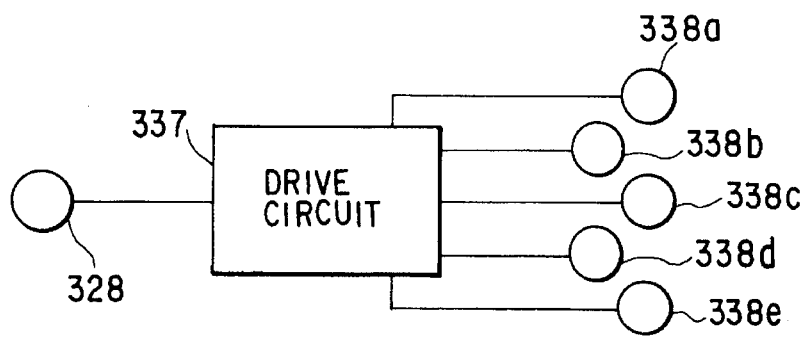
FIGS. 34A and 34B are a block diagram of the electric unit of the tenth embodiment.
Figure 34B:
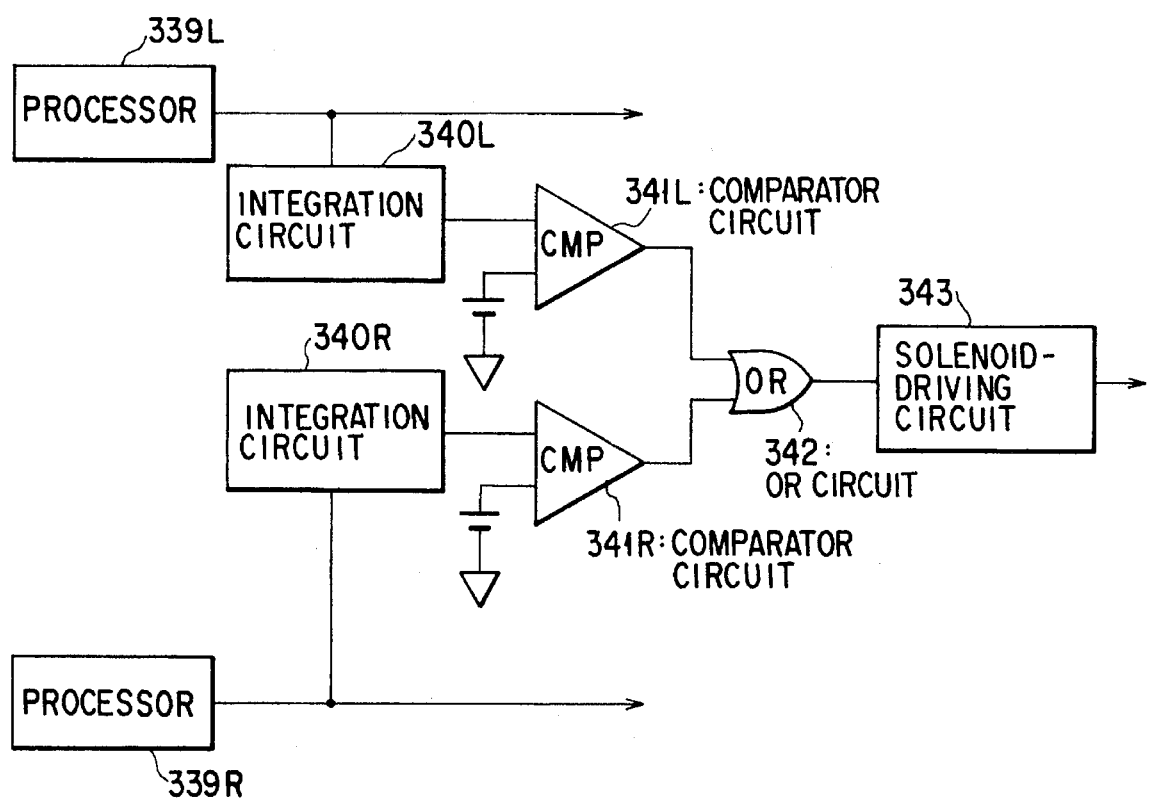

FIGS. 32, 33, 34A and 34B show a surgical microscope system according to the tenth embodiment of this invention. To be more specific, FIG. 32 is a side view of the barrel-supporting unit of the system; FIG. 33 schematically shows the left one of the two optical system contained in the barrel of the system; and FIGS. 34A and 34B are a block diagram of the electric unit incorporated in the system.

As shown in FIG. 32, the barrel-supporting unit comprises a movable platform 321, three arms 322, 323 and 324, a distal arm 325. The platform 321 is placed in rolling contact with the floor of an operation room, and comprises a base 321a and a pillar 321b. The pillar 321b stands upright on the base 321a.

The first arm 322 is coupled, at one end, to the top of the pillar 321b by a shaft Oa which can rotate. The second arm 323 is coupled, at one end, to the other end of the first arm 322 by a shaft Ob which can rotate. The third arm 324 is coupled, at one end, to the other end of the second arm 323 by a shaft Oc which can rotate.

The distal arm 325 is coupled, at one end, to the other end of the third arm 324 by a shaft Oe which can rotate. The distal arm 325 has a parallelogramic link secured to a shaft Od which can rotate. Thus, the arm 325 can be rotated in the direction of the arrow, or toward and away from an object (not shown) which a surgeon treats while observing it under the microscope system. A handle 326 and a barrel 327 are connected to the other end of the distal arm 325.

Connected to the distal arm 325 which is coupled to the movable platform 321 by the three arms 322, 323 and 324, the barrel 327 can be moved to any position in the operation room. Electromagnetic clutches 338a to 338e are mounted on the shafts Oa to Oe, respectively. When driven by operating switches 328 on on the handle 326, the clutches 338a to 338e lock the shafts Oa to Oe and, ultimately, the arms 322, 323, 324 and 325.

The the barrel 327 contains a left optical system and a right optical system which are identical in structure. Only the left optical system will be described, with reference to FIG. 33. As clear from FIG. 33, the left optical system comprises an objective lens 330L, a magnification-varying optical unit 331L, a focusing lens 332L, an imaging device 333L, a shaft 334L, a lens support 335L and an ocular lens 336L. These components are arranged in the order mentioned, from the object.

The imaging device 333L is located at the focal point of the focusing lens 332L, attached to the lens support 335L which is secured to the shaft 334L. The shaft 334L can be rotated when driven by a solenoid (not shown), to rotate the imaging device 332L between a horizontal position indicated by solid lines and a vertical position indicated by broken lines. The ocular lens 336L is located, having its focal point set at the focal point of the focusing lens 332L.

The surgical microscope system shown in FIG. 32 has an electric unit which is illustrated in FIGS. 34A and 34B. With reference to FIGS. 34A and 34B, the electric unit will be described.

As shown in FIG. 34A, the switches 328 on the handle 326 are connected to a drive circuit 337. The output of the circuit 337 is are electrically connected to the electromagnetic clutches 338a to 338e which are mounted on the shafts Oa to Oe, respectively.

As shown in FIG. 34B, the electric unit comprises Processors 339L and 339R, integration circuits 340L and 340R, comparator circuits 341L and 341R, an OR circuit 342 and a solenoid-driving circuit 343. The processor 339L has an image-forming circuit connected to the imaging device 333L and designed to generate a left-image video signal. Similarly, the processor 339R has an image-forming circuit connected to the imaging device 333R and designed to generate a right-image video signal. The processors 339L and 339R are connected to the integration circuits 340L and 340R, which in turn are connected to the comparator circuits 341L and 341R. The outputs of both comparator circuits 341L and 341R are connected to the OR circuit 342, the output of which is connected to the solenoid-driving circuit 343.

The integration circuit 340L and the comparator circuit 341L cooperate to detect whether or not the processor 339L has output a video signal. The integration circuit 340R and the comparator circuit 341R cooperate to detect whether or not the processor 339R has output a video signal. If it is determined that neither processor has output a video signal, the OR circuit 342 supplies a signal to the solenoid-driving circuit 343. In response to this signal, the circuit 343 drives the solenoid (not shown), whereby the shafts 334L and 334R are rotated, rotating the lens supports 335L and 335R. As a result, both imaging devices 332L and 332R are rotated to the vertical position, retreating from the optical paths of the left and right optical systems contained in the barrel 327. The surgeon can then observe a 3D image of the object through the ocular lenses 336L and 336R.

In the tenth embodiment (FIG. 32), after taking of the head-mount display, the surgeon can observe the 3D image of the object through the ocular lenses 336L and 336R which are exposed through the two openings made in the drape covering the barrel 327.

Figure 35:
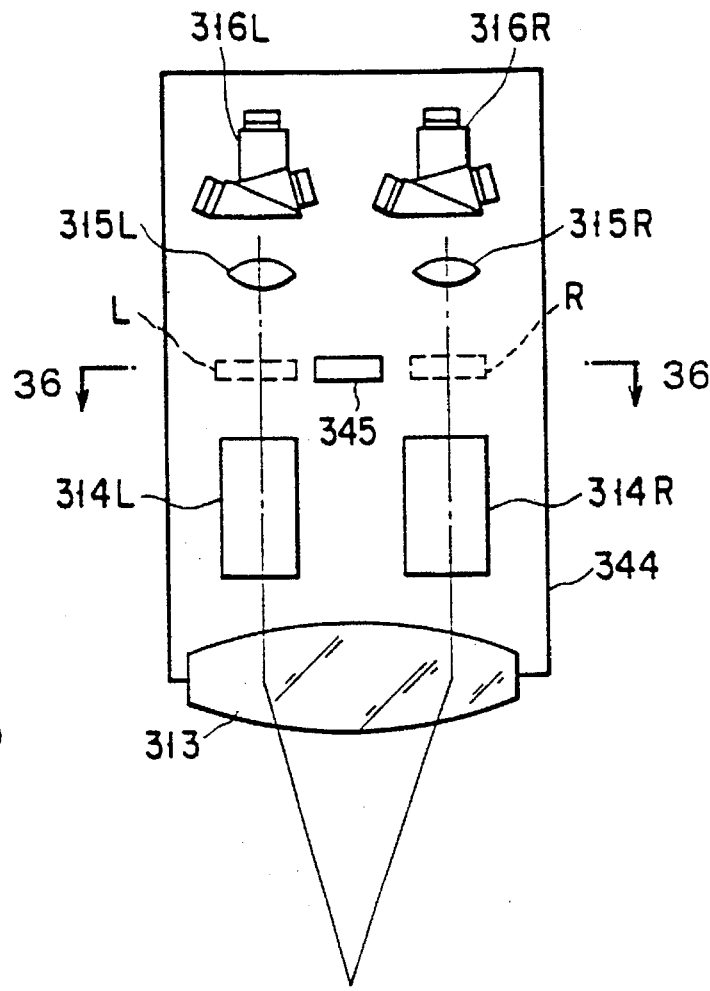
FIG. 35 schematically shows the barrel of a surgical microscope system according to an eleventh embodiment of the present invention.
Figures 36, 37:
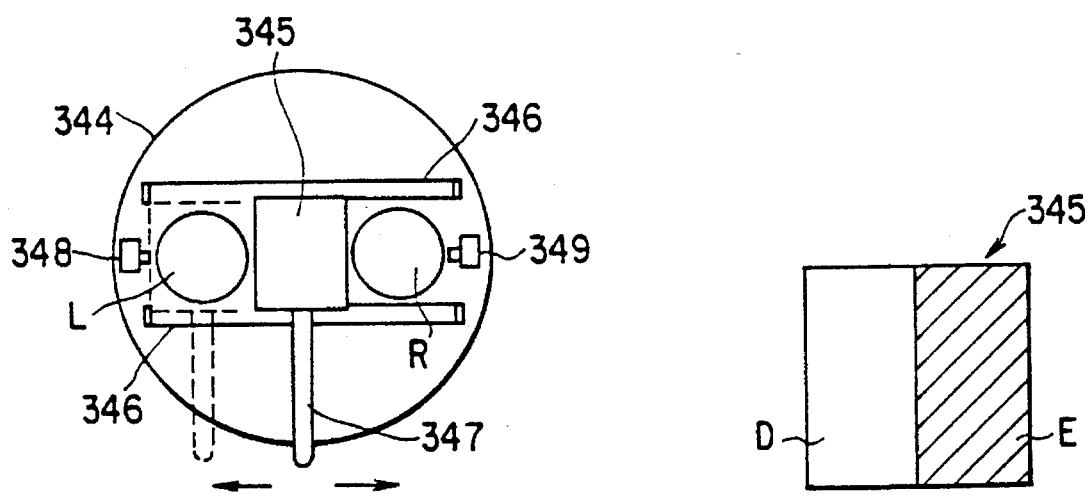
FIG. 36 is a sectional view of the barrel, taken along line 36—36 in FIG. 35.
FIG. 37 is a front view of the liquid-crystal shutter contained in the barrel.
Figure 39:
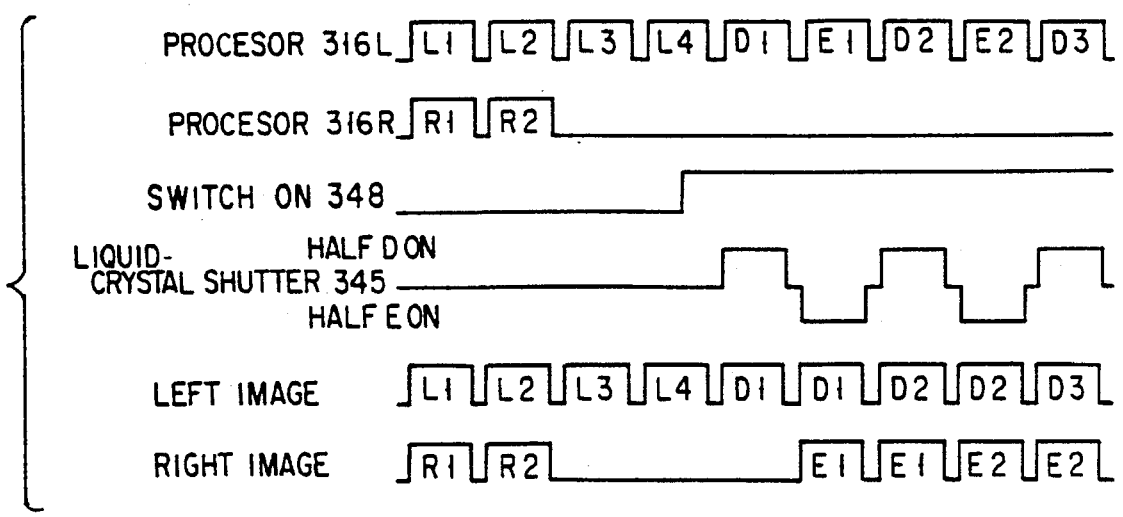
FIG. 39 is a timing chart illustrating the operation of the electric unit shown in FIG. 37.

FIGS. 35 to 39 show a surgical microscope system according to the eleventh embodiment of this invention. To state more precisely, FIG. 35 is a schematic view of the barrel of the microscope system; FIG. 36 is a sectional view of the barrel, taken along line 36—36 in FIG. 35; FIG. 37 is a front view of the liquid-crystal shutter contained in the barrel; FIG. 38 is a block diagram of the electric unit of the microscope system; and FIG. 39 is a timing chart illustrating the operation of the electric unit. The components of the system, which are similar or identical to those of the ninth embodiment, are designated at the same reference numerals, and will be omitted the detailed explanation.

The eleventh embodiment is characterized in that a video signal generated by one of the two imaging devices is processed to form a 3D image, even if no video signal cannot be generated by the other imaging device. As shown in FIGS. 35 and 36, a liquid-crystal shutter 345 is provided in the barrel 344, in a plane existing between magnification-varying optical units 314L and 314R, on the one hand, and focusing lenses 315L and 315R. The shutter 345 is mounted on a guide 346, in sliding contact therewith, and connected to a handle 347 which protrudes outside from the barrel 344.

In most cases, the liquid-crystal shutter 345 is placed between a left optical path L and a right optical path R, as indicated by solid lines. As shown in FIG. 36, two switches 348 and 349 are located in that plane, at the ends of guide 346. When the handle 347 is moved to the left, bringing the shutter 345 into the left optical path L, the left switch 348 is turned on. Alternatively, when the handle 347 is moved to the right, bringing the shutter 345 into the right optical path R, the right switch 349 is turned on. Hence, it is possible to determine where in said plane the liquid-crystal shutter 345 is located.

As shown in FIG. 37, the liquid-crystal shutter 345 is a filter consisting of a transparent half D and a non-transparent half E. The half D allows passage of light (ON), whereas the half E shields light (OUT).

With reference to FIGS. 38 and 39, the operation of the electric unit of the eleventh embodiment will be explained.

The liquid-crystal shutter 345 is usually located at the middle position, between the left optical path L and the right optical path R, as is illustrated in FIG. 37. Thus, the images represented by the video signals generated by processors 319L and 319R are displayed by displays (not shown).

Assume that the imaging device 316 (FIG. 35) or the processor 319R fails to operate, and no image is obtained in the left optical path. In this case, the surgeon moves the handle 347 to the left, bringing the shutter 345 into the left optical path L. As a result, the left switch 348 is turned on, generating a signal. This signal is supplied to a logic circuit 350L. The logic circuit 350L controls a selector circuit 351 such that the video signal generated by the processor 319R is supplied to the display 304R.

In the meantime, the control signal output by the logic circuit 350L is input via an OR circuit 352 to switching circuits 353L and 353R. The output signal of the selector circuit 351 is supplied to field-detecting circuits 354a and a field-switching circuit 354b. The field-detecting circuit 354a determines whether the field is an even-numbered one or an odd-numbered one. The output signal of the circuit 354a is supplied to a shutter driver 355 and also to the field-switching circuit 354b. The circuit 354b switches the field, and the shutter driver 355 drives the shutter 345.

As can be understood from FIG. 39, when the processor 316L outputs a video signal D1, the left half D of the shutter 345 is transparent (ON). The video signal D1 is input to a image memory 356L through the field-switching circuit 354b. Every time the output signal of the field-detecting circuit 354a is supplied to the image memory 356L, the video signal D1 is supplied twice to the display 304R via the switching circuit 353L. The display 304R displays twice the image represented by the signal D1, which the surgeon sees with his or her left eye.

On the other hand, when the processor 316L outputs a video signal E1, the right half E of the shutter 345 is transparent (ON). The video signal E1 is input to a image memory 356R through the field-switching circuit 354b. Every time the output signal of the field-detecting circuit 354a is supplied to the image memory 356R, the video signal E1 is supplied twice to the display 304R via the switching circuit 353R. The display 304R displays twice the image represented by the signal E1, which the surgeon sees with his or her right eye.

Thus, with the eleventh embodiment it is possible for the surgeon to see a 3D image of the object even if no image is obtained in one of the optical paths of the barrel 344, merely by moving the handle 347 to move the liquid-crystal shutter 345 in the barrel 344. Since the shutter 345 is small, the barrel 344 need not be made larger to accommodate it. Moreover, the conventional optical system, such as a zooming system, can be used without being modified at all.

Figure 40:
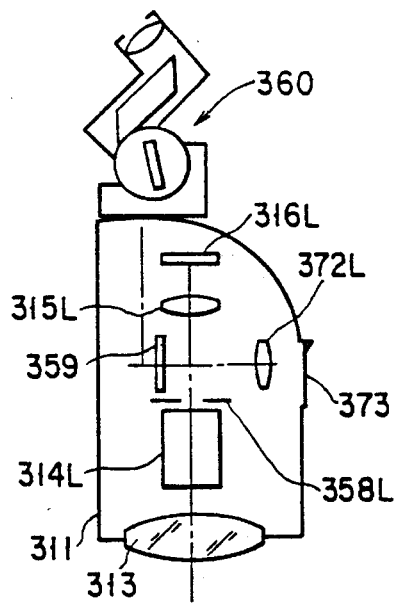
FIG. 40 is a sectional view of the barrel of a surgical microscope system according to a twelfth embodiment of this invention, showing the specific positions which some components assume in photographing mode.
Figure 41:
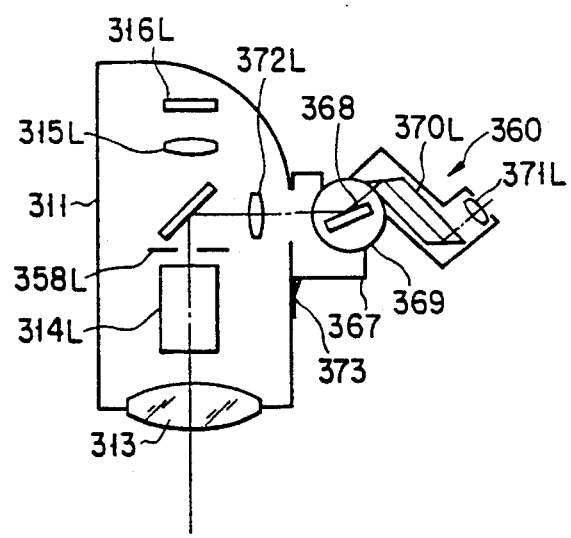
FIG. 41 is a sectional view of the barrel of the system, illustrating the other specific positions which the components assume to allow a surgeon to observe an optical image of an object.

FIGS. 40 to 44 show a surgical microscope system which is the twelfth embodiment of this invention. More precisely, FIGS. 40 and 41 are sectional views of the barrel of the system; FIG. 42 is a side view of the barrel; FIG. 43 is a side view of the rotatable mirror used in the system; FIG. 44 is a block diagram of the electric unit of the system.

The twelfth embodiment is characterized in two respects. First, a rotatable mirror 359 is arranged above diaphragms 358L and 358R and below focusing lens 315L and 315R and can be rotated to switch the deflecting the light beams supplied through the diaphragms 358L and 358R. Second, a movable barrel 360 is rotated from one position to another to rotate the rotatable mirror 359.

As shown in FIG. 42, a shaft 316 horizontally extends through a barrel 311, with its one end portion protruding outside. The barrel 311 has an arcuate surface 312a, curving along a circuit the center of which is the axis of the shaft 316. An arm 362 is secured at one end to the protruding end portion of the shaft 316. The movable barrel 360 is connected to the other end of the arm 362. The arm 362 can be rotated through 90°. When the arm 362 is rotated, the movable barrel 360 is rotated along the arcuate surface 312a, by the same angle through which the arm is rotated.

As shown in FIG. 43, a small gear 363 is mounted on the shaft 361 and in mesh with an idle gear 365a. The idle gear 365a engages with a large gear 365 which is mounted on a mirror shaft 364. Fastened to the mirror shaft 364 is a mirror support 366. It is to the mirror support 366 that the rotatable mirror 359 is secured. The gear ratio of the small gear 363 to the large gear 365 is 1:2. Hence, when the shaft 361 is rotated by 90°, the mirror shaft 364 is rotated by 45° in the same direction.

As shown in FIG. 41, the movable barrel 360 has a support 367 and a tilt section 369. The support 367 supports the tilt section 369. The tilt section 369 contains a rotatable mirror 368. The support 367 contains two prisms 370L and 370R and two ocular lenses 371L and 371R.

The movable barrel 360 can be moved between two positions, the first position shown in FIG. 40 and the second position shown in FIG. 41. When the barrel 360 is in the first position, imaging devices 316L and 316R (only the device 316L is shown in FIGS. 40 and 41) can generate video signals representing the left and right images of an object. When the barrel 360 is in the second position, a 3D image of the object can be observed through the barrel 360.

When the arm 362 is rotated downwards through 90°, moving the barrel 360 from the first position to the second position, the shaft 361 is rotated by 90°, too. The rotation of the shaft 361 is transmitted from the small gear 361 to the large gear 365 via the idle gear 365a. The mirror shaft 364 is thereby rotated by 45°, rotating the rotatable mirror 359 by 45°. As a result, the mirror 359 reflects the light beams applied via the diaphragms 358L and 358R from magnification-varying optical units 314L and 314R. (Only the unit 314L and only the diaphragm 358L are shown in FIGS. 40 and 41). A door 373 is slidably mounted on the outer circumferential surface of the barrel 311, for closing and opening the window which is made in the barrel 311 and which opposes relay lenses 372L and 372R. (Only the lens 372L is shown in FIGS. 40 and 41.)

When the arm 362 is rotated upwards through 90°, moving the barrel 360 from the second position to the first position, the movable barrel 360 no longer makes an obstacle to the surgeon who is treating the object. As the barrel 360 is moved to the first position, the rotatable mirror 359 is rotated upwards, moving out of both optical paths in the barrel 311. Then, the imaging devices 316L and 316R and processors 319L and 319R (FIG. 44) cooperate to form a 3D image of the object.

Assume any one of the imaging devices 316L and 316R or the processors 319L and 319R, for example, fails to operate, and no 3D image of the object can be generated. In this case, the surgeon only needs to move the barrel 360 downwards from the first position to the second position, in order to observe an optical 3D image of the object. As the barrel 360 is moved so, the rotatable mirror 359 is rotated by 45°. The mirror 359 reflects the light beams applied from the magnification-varying optical units 314L and 314R, to the mirror 368 provided in the movable barrel 360. The surgeon can see the optical 3D image of the object. This enables the surgeon to continue the operation.

The electric unit of the system will be described, with reference to FIG. 44. As shown in FIG. 44, the electric unit has a switch 374, a logic circuit 375, a brightness-calculating section 376, a drive circuit 377, a switching circuit 378, a control data memory 379, a lamp-driving circuit 380, and a lamp 381. The switch 374 is provided for detecting if the barrel 360 remains in the second position or not. The switch 374 put the drive circuit 377 in a condition that it controls the diaphragms 358L, 358R in accordance with image signals supplied from processors 319L, 319R and calculated through the brightness-calculating section 376, not with an order from logic circuit 375.

When the movable barrel 360 is moved to the second position shown in FIG. 41, the switch 375 is turned on, the logic circuit 375 supplies a switching signal to the switching circuit 378 and drives the control data memory 379 to supply signals. The diaphragms 258L, 258R are then adjusted, based on the data supplied from the memory 379, by the drive circuit 377. Also, the lamp-driving circuit 380 for driving the lamp 381 sets the brightness to a desired value.

The memory 379 stores data that impart the best condition for optical observation. When observation is performed through video image, the openings of both diaphragms 358L and 358R are reduced so much as to increase the focal depth of the optical units provided in the barrel 311. The lamp-driving circuit 380 drives the lamp 381 such that the lamp 381 emits an increased amount of light.

As indicated above, once moved from the second position to the first position, the movable barrel 360 makes no obstacle to the surgeon who is treating the object. Moreover, even if no 3D image cannot be formed from video signal due to malfunction of the imaging device 316L or 316R, or that of the processor 319L or 319R, the surgeon can observe an optical 3D image of the object, merely by moving the barrel 360 from the first to the second position. Furthermore, when the surgeon so moves the barrel 360, both drive circuit 377 and the lamp-driving circuit 380 are automatically controlled in accordance with the data stored in the memory 379 and representing the conditions for imparting the best possible brightness to the optical 3D image observed through the movable barrel 360. Thus, the surgeon is not interrupted and can continue the operation.

FIGS. 45 and 46 illustrate a surgical microscope system which is a thirteenth embodiment of the present invention. To state more correctly, FIG. 45 is a sectional front view of the barrel of the system, and FIG. 46 is a plan view of the barrel. The components of the system, which are similar or identical to those of the twelfth embodiment, are designated at the same reference numerals in FIGS. 45 and 46, and will not be described in detail in the following description.

The thirteenth embodiment is characterized in three aspects. First, a turntable 384 which is arranged above focusing lenses 315L and 315R both contained in the barrel 312 and which can rotate around an axis 383. Second, an imaging section 385 and an observation barrel 386 are mounted on the turntable 384 and located symmetrically with respect to the axis 383. Third, the observation barrel 386 can be optically connected to the barrel 312.

The observation barrel 386 has a support 387 and a tilt section 390. The support 387 supports the tilt section 390. The support 387 contains two mirrors 388 and 389. The tilt section 390 contains contains two prisms 370L and 370R and two ocular lenses 371L and 371R. The mirrors 388 and 389 are positioned in the support 387, such that they guide the light beams output from the barrel 312 to the prisms 370L and 370R and hence to the ocular lenses 371L and 371R.

While remaining optically disconnected from the barrel 312 as shown in FIGS. 45 and 46, the observation barrel 386 does not make an obstacle to a surgeon who is treating an object. The surgeon can see a 3D image of the object displayed by means of the imaging section 385 which comprises imaging devices and processors—all being of the types used in the twelfth embodiment.

Should any one of the imaging devices and the processors fail to operate, proving no 3D image of the object, the surgeon only needs to rotate the turntable 385 through 180°, thereby opposing the first mirror 388 to both focusing lenses 315L and 315R contained in the barrel 312. Then, the first mirror 388 reflects the output beams of the lenses 315L and 315R to the second mirror 389, which reflects both beams to the prisms 370L and 370R. The light beams are applied to the ocular lenses 371L and 371R, whereby the surgeon can see an optical 3D image of the object and continue the operation on the object.

FIGS. 47 and 48 show the fifth modified surgical microscope system according to this invention. More precisely, FIG. 47 is a schematic representation of the fifth modified system, and FIG. 48 is a diagram showing an image fifth modified system displays.

As shown in FIG. 47, the barrel 400 of this modified system contains an objective lens 401, a pair of magnification-varying optical units 402L and 402R, a pair of focusing lenses 403L and 403R, and a pair of RGB imaging devices 404L and 404R. These components are arranged in the order mentioned, from an object (not shown) which a surgeon treats while observing it under this modified microscope system.

The RBG imaging devices 404L and 404R comprise each a color-resolving prism, a R-imaging element, a G-imaging element, and a B-imaging element. The imaging devices 404L and 404R are connected to processors 405L and 405R. The video signal output by the processor 405R and representing a right image of the object is supplied to a superimposing circuit 407. The circuit 407 processes the video signal so that a mark 406 may be superimposed on the right image of the object, as is illustrated in FIG. 48. The video signal, thus processed, is supplied to a 3D video signal generator 408. Also supplied to the signal generator 408 is the video signal output by the processor 405L and representing a left image of the object. The signal generator 408 processes the input video signals, generating a 3D video signal. The 3D video signal is supplied to a liquid-crystal driving circuit 410 and also to a display section 409a. In accordance with the 3D video signal the driving circuit 410 generates a drive signal for driving a liquid-crystal polarizing plate 409 covering the display section 409a. The system further comprises a logic circuit (not shown) which generates signals for reversing the operating timing of the liquid-crystal polarizing plate 409, covering the screen of the display section 409a, regarding to the 3D video signal. A 3D image of the object is thereby displayed on the liquid-crystal polarizing plate 409.

Since the mark 406, which is reversible, is superimposed on the right image only, the right image of the object can be distinguished from the left image.

FIGS. 49 and 50 show the sixth modified surgical microscope system according to this invention. More specifically, FIG. 49 is a side view of the modified system, and FIG. 50 is a block diagram of the electric unit incorporated in the modified system. The sixth modified system is a combination of the tenth embodiment (FIG. 32) and the barrel 400 of the fifth modified system (FIG. 47). To state more precisely, the barrel 400 is secured to the distal arm 325.

As shown in FIG. 50, the electric unit of the sixth modified system includes a logic circuit 411 for generating a signal upon detecting that the distal arm 325 has been rotated in the direction of the arrow. This signal is supplied to a superimposing circuit 407. The signals for driving electromagnetic clutches 338a to 338e are supplied from switches 328 through the switching circuit 328a to a drive circuit 337 and the logic circuit 411.

The signal from the logic circuit 411 shows that the view field has Just been switched. Thus, upon receipt of this signal, the superimposing circuit 407 processes the video signal generated by a processor 405R so that a mark 406 may be superimposed on the right image of the object for a predetermined period of time. Since the video signal changes because of the switching of the view field, the 3D aspect the image has at this time is recognized.

FIG. 51 shows the electric unit incorporated in a seventh modified surgical microscope system. In this modified system, an integration circuit 412L and a comparator circuit 413L cooperate to determine whether or not a processor 405L has generated a video signal. Similarly, an integration circuit 412R and a comparator circuit 413R cooperate to determine whether or not a processor 405R has generated a video signal. A switching circuit 414L connects the processor 405L or a superimposing circuit 407 to a superimposing circuit 415L in accordance with the output signal of the comparator circuit 413L. A switching circuit 414R connects the processor 405L or the superimposing circuit 407 to a superimposing circuit 415R in accordance with the output signal of the comparator circuit 413R.

When both processors 405L and 405R generate a video signal each, as in normal condition, the video signal generated by the processor 405L is supplied to a transmitter 416L through the switching circuit 414L and the superimposing circuit 415L, while the video signal generated by the processor 405R is supplied to a transmitter 416R through the switching circuit 414R and the superimposing circuit 415R. One of the video signals is superimposed a mark (not shown) by one of superimposing circuits 415R, 415L. The video signals are then transmitted from the transmitters 416L and 416R to the receiver 417 of the head-mount display which a surgeon wears. When one of the processors, for example the processor 405R, does not generate a video signal, the integration circuit 412R and the comparator circuit 413R detect this fact. In this case, the switching circuit 414R disconnects the processor 405R from the superimposing circuit 415R and connects the processor 405L to the superimposing circuit 415R. As a result, the video signal generated by the processor 405L is supplied to the superimposing circuit 415R. The output signal of an OR circuit 418, which is a logic-sum signal of the outputs of the comparator circuits 413L and 413R, is supplied to the superimposing circuits 415L and 415R. In response to this signal the superimposing circuits 415L and 415R process the video signal (i.e., the output signal of the processor 405L) so that a mark may be superimposed on the left image of the object. The mark, thus superimposed, indicates that the image is not a 3D image. The transmitters 416L and 416R transmit the video signals output by the superimposing circuits 415L and 415R to the receiver 417 on the head-mount display. Seeing the mark on the image, the surgeon can understand that the image he or she is observing is a non-3D image.

FIGS. 52, 53 and 54 illustrate the eighth modified surgical microscope system according to the present invention. As can be understood from FIG. 52, this modified system is a combination of the tenth embodiment (FIG. 32) and the barrel 400 of the fifth modified system (FIG. 47). More precisely, the barrel 400 is secured to the distal arm 325. The eighth modified system is characterized in that the shutter speed is reduced for some time after any one of electromagnetic clutches 338a to 338e has been operated, thereby to minimize the influence of the shake of the arm which has just been locked by the electromagnetic clutch.

As shown in FIG. 53, a switching circuit 328a is connected by a logic circuit 419 to a pulse generating circuit 420. When one of switches 328 is operated, causing one of the electromagnetic clutches 338a to 338e to lock one of the arms 322, 323, 324 and 325 (FIG. 52), the switching circuit 328a supplies a signal not only to a drive circuit 337 but also to the logic circuit 419. The output signal of the logic circuit 419 is supplied to the pulse generating circuit 420. The pulse generating circuit 420 supplies high-frequency clock pulses to reading circuits 422L and 422R for the time preset in a timer 421, thereby increasing the shutter speed for the preset time. At all other times, the pulse generating circuit 420 supplies ordinary clock pulses to the reading circuits 422L and 422R. The reading circuits 422L and 422R are connected to monitors 424L and 424R by video-signal processing circuits 423L and 423R, respectively.

FIGS. 55 and 56 show a ninth modified surgical microscope system according to the invention. The ninth modified system is characterized in that a zooming magnification is detected, the vibration of a barrel 400 is detected, the vibration frequency is calculated from the vibration detected, and an appropriate shutter speed is determined from the zooming magnification and the vibration frequency.

More specifically, as shown in FIG. 55, a displacement (acceleration) sensor 425 is provided in the barrel 400. The output signal of the sensor 425 is supplied via an amplifier 426 to a zero-crossing detector 427, which converts the input signal into a pulse signal. A clock pulse generating circuit 428 supplies clock pulses to a counter 429. The counter 429 counts clock pulses and outputs a count upon lapse of every unit time. The count signal is supplied to a frequency detecting circuit 430, which detects the frequency of the vibration of the barrel 400. The circuit 430 supplies a signal representing the vibration frequency to a shutter-speed setting circuit 434.

In the meantime, a zooming motor 431 is driven by the drive signal output by a drive circuit 431a. The motor 431 is connected to an encoder 432, which generates and supplies a signal to a zooming magnification detector 433. The detector 433 detects the zooming magnification and generates a signal representing the zooming magnification. The output signal of the detector 433 is supplied to shutter-speed setting circuit 434.

The shutter-speed setting circuit 434 generates a clock pulse signal in accordance with the vibration frequency and the zooming magnification. The clock pulse signal is supplied to reading circuits 422L and 422R, thereby changing the shutter speed for the exposure time of the imaging devices (not shown), as is illustrated in FIG. 56. Generally, the greater the zooming magnification, the more greatly will the vibration of the zoom 400 influences the shake of an image. Nonetheless, this modified system can minimize the shake of the image, enabling a surgeon to observe the image with ease.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A surgical microscope system for producing a 3-dimensional virtual image of an object to be viewed by an observer, the system comprising:

stereoscopic imaging means for forming two images of an object from two light beams focussed in two respective optical paths;

display means for respectively displaying the two images of the object formed by the imaging means; and image-projecting means for projecting the two images respectively displayed by the display means to form a 3-dimensional virtual image of the object such that the observer perceives the 3-dimensional virtual image to be located at a distance from the observer equal to the actual distance between the observer and the object.

* * * * *